US012176596B2

(12) United States Patent
Rozbicki et al.

(10) Patent No.: US 12,176,596 B2
(45) Date of Patent: Dec. 24, 2024

(54) BUILDING ANTENNA

(71) Applicant: View, Inc., Milpitas, CA (US)

(72) Inventors: Robert T. Rozbicki, Saratoga, CA (US); Stephen Clark Brown, San Mateo, CA (US); Nitesh Trikha, Pleasanton, CA (US); Philip F. Kearney, III, San Jose, CA (US); John Sanford, Escondido, CA (US); Harold Hughes, Los Altos Hills, CA (US); Todd Daniel Antes, San Jose, CA (US)

(73) Assignee: View, Inc., San Jose, CA (US)

( * ) Notice: Subject to any disclaimer, the term of this patent is extended or adjusted under 35 U.S.C. 154(b) by 345 days.

(21) Appl. No.: 17/612,479

(22) PCT Filed: May 31, 2020

(86) PCT No.: PCT/US2020/035485
§ 371 (c)(1),
(2) Date: Nov. 18, 2021

(87) PCT Pub. No.: WO2020/243690
PCT Pub. Date: Dec. 3, 2020

(65) Prior Publication Data
US 2022/0231396 A1 Jul. 21, 2022

Related U.S. Application Data

(60) Provisional application No. 62/864,641, filed on Jun. 21, 2019, provisional application No. 62/858,787,
(Continued)

(51) Int. Cl.
*H01Q 1/12* (2006.01)
*H01Q 1/00* (2006.01)
(Continued)

(52) U.S. Cl.
CPC ........... *H01Q 1/007* (2013.01); *H01Q 1/1271* (2013.01); *H01Q 21/061* (2013.01); *H01Q 21/24* (2013.01)

(58) Field of Classification Search
CPC ... E06B 7/28; E06B 2009/2464; H01Q 1/007; H01Q 1/1271; H01Q 1/246; H01Q 1/44; H01Q 9/0407; H01Q 9/40; H01Q 21/06
See application file for complete search history.

(56) References Cited

U.S. PATENT DOCUMENTS 4,340,813 A 7/1982 Sauer
4,864,314 A 9/1989 Bond
(Continued)

FOREIGN PATENT DOCUMENTS

AU 2012209352 A1 8/2013
AU 2015101660 A4 12/2015
(Continued)

OTHER PUBLICATIONS

Alarifi, A. et al., "Ultra Wideband Indoor Positioning Technologies: Analysis and Recent Advances", Sensors, May 16, 2016, vol. 16 No. 5, pp. 1-36.
(Continued)

*Primary Examiner* — Hasan Islam
(74) *Attorney, Agent, or Firm* — Weaver Austin Villeneuve & Sampson LLP; Brian D. Griedel

(57) ABSTRACT

Techniques for transceiving radio frequency (RF) signals through a window of a building are disclosed, the window having a first surface facing an interior of the building. An antenna arrangement is attached to a building structure adjacent the first surface and the antenna arrangement includes one or more radiating elements configured to transceive the RF signals through the window. In some embodiments, the building structure is mullion. In some
(Continued)

embodiments a window surface includes an electrochromic and/or low emissivity coating that is excluded from a region proximate to the radiating elements.

27 Claims, 19 Drawing Sheets

Related U.S. Application Data filed on Jun. 7, 2019, provisional application No. 62/855,784, filed on May 31, 2019.

(51) Int. Cl.
*H01Q 21/06* (2006.01)
*H01Q 21/24* (2006.01)

(56) References Cited

U.S. PATENT DOCUMENTS 4,874,903 A 10/1989 Clarke
4,932,755 A 6/1990 Holdridge et al.
5,139,850 A 8/1992 Clarke et al.
5,147,694 A 9/1992 Clarke
5,202,788 A 4/1993 Weppner
5,625,369 A * 4/1997 Newman ................ H01Q 21/08 343/770
5,724,187 A 3/1998 Varaprasad et al.
5,729,824 A 3/1998 O'Neill et al.
5,959,586 A 9/1999 Benham et al.
6,032,020 A 2/2000 Cook et al.
6,089,721 A 7/2000 Schierbeek
6,104,513 A 8/2000 Bloom
6,128,471 A 10/2000 Quelch et al.
6,294,111 B1 9/2001 Shacklett, III et al.
6,407,847 B1 6/2002 Poll et al.
6,456,239 B1 9/2002 Werb et al.
6,588,250 B2 7/2003 Schell
6,620,342 B1 9/2003 Burchill et al.
6,703,981 B2 3/2004 Meitzler et al.
6,795,226 B2 9/2004 Agrawal et al.
6,809,692 B2 10/2004 Puente Baliarda et al.
6,897,936 B1 5/2005 Li et al.
6,965,813 B2 11/2005 Granqvist et al.
7,031,727 B2 4/2006 Baskin
7,111,952 B2 9/2006 Veskovic
7,310,355 B1 12/2007 Krein et al.
7,382,636 B2 6/2008 Baarman et al.
7,554,437 B2 6/2009 Axelsen
7,588,067 B2 9/2009 Veskovic
7,629,400 B2 12/2009 Hyman
7,722,948 B2 5/2010 Dixon et al.
7,911,348 B2 3/2011 Rodgers
7,950,827 B2 5/2011 Veskovic
7,963,675 B2 6/2011 Veskovic
8,022,977 B2 9/2011 Kanade et al.
8,085,460 B2 12/2011 Finley et al.
8,086,433 B2 12/2011 Lee et al.
8,099,140 B2 1/2012 Arai
8,213,074 B1 7/2012 Shrivastava et al.
8,249,731 B2 8/2012 Tran et al.
8,614,848 B2 12/2013 Ueda et al.
8,634,764 B2 1/2014 Cruz et al.
8,705,162 B2 4/2014 Brown et al.
8,711,465 B2 4/2014 Bhatnagar et al.
8,780,432 B1 7/2014 Nguyen
8,924,076 B2 12/2014 Boote et al.
8,927,069 B1 1/2015 Estinto et al.
8,975,789 B2 3/2015 Snyker et al.
9,121,837 B2 9/2015 Chan et al.
9,454,055 B2 9/2016 Brown et al.
9,551,913 B2 1/2017 Kim et al.
9,664,976 B2 5/2017 Rozbicki
9,715,242 B2 7/2017 Pillai et al.
9,898,912 B1 2/2018 Jordan, II et al.
9,930,463 B2 3/2018 Little
9,965,865 B1 5/2018 Agrawal et al.
10,153,845 B2 12/2018 Ashrafi
10,156,852 B2 12/2018 Bakhishev et al.
10,178,638 B1 1/2019 Stamatakis et al.
10,254,618 B2 4/2019 Parker
10,289,094 B2 5/2019 Ashdown et al.
10,299,101 B1 5/2019 Lim et al.
10,322,680 B2 6/2019 Terashima et al.
10,488,837 B2 11/2019 Cirino
10,505,751 B2 12/2019 Casilli
10,673,121 B2 6/2020 Hughes et al.
10,724,867 B1 7/2020 Waful et al.
10,797,373 B2 10/2020 Hughes et al.
10,867,266 B1 12/2020 Carlin et al.
10,917,259 B1 2/2021 Chein et al.
10,921,675 B2 2/2021 Barnum et al.
10,923,226 B2 2/2021 Macary et al.
10,954,677 B1 3/2021 Scanlin
10,969,645 B2 4/2021 Rozbicki et al.
10,982,487 B2 4/2021 Ramirez
11,054,711 B2 7/2021 Shrivastava et al.
11,114,742 B2 9/2021 Shrivastava et al.
11,182,970 B1 11/2021 Kathol
11,205,926 B2 12/2021 Shrivastava et al.
11,322,818 B2 * 5/2022 Kum ...................... H01Q 15/02
11,342,791 B2 5/2022 Rozbicki et al.
11,462,814 B2 10/2022 Hughes et al.
11,630,366 B2 4/2023 Shrivastava et al.
11,631,493 B2 4/2023 Schlameuss et al.
11,670,833 B2 6/2023 Hughes et al.
11,732,527 B2 8/2023 Rozbicki et al.
11,743,071 B2 8/2023 Trikha et al.
11,799,187 B2 10/2023 Shrivastava et al.
11,822,159 B2 11/2023 Brown et al.
12,057,220 B2 8/2024 Schlameuss et al.
12,087,997 B2 9/2024 Brown et al.
2001/0042976 A1 11/2001 Breed et al.
2002/0024424 A1 2/2002 Burns et al.
2002/0072868 A1 6/2002 Bartone et al.
2002/0109634 A1 8/2002 Aisenbrey
2002/0140611 A1 10/2002 Ligander et al.
2003/0007462 A1 1/2003 Makinen et al.
2003/0034926 A1 2/2003 Veerasamy
2003/0039257 A1 2/2003 Manis et al.
2003/0098791 A1 5/2003 Carlson et al.
2003/0112187 A1 6/2003 Whitehouse
2003/0163351 A1 8/2003 Brown et al.
2003/0227663 A1 12/2003 Agrawal et al.
2003/0232181 A1 12/2003 Simpson et al.
2004/0053576 A1 3/2004 Vasseur et al.
2004/0148057 A1 7/2004 Breed et al.
2004/0150867 A1 8/2004 Lee et al.
2004/0160324 A1 8/2004 Stilp
2004/0160657 A1 8/2004 Tonar et al.
2004/0196179 A1 10/2004 Turnbull
2005/0002662 A1 1/2005 Arpa et al.
2005/0046584 A1 3/2005 Breed
2005/0063036 A1 3/2005 Bechtel et al.
2005/0082639 A1 4/2005 Kikuta et al.
2005/0117193 A1 6/2005 Poll et al.
2005/0157675 A1 7/2005 Feder et al.
2005/0213992 A1 9/2005 Piehler
2005/0254442 A1 11/2005 Proctor et al.
2005/0260983 A1 11/2005 DiPiazza
2006/0033663 A1 2/2006 Saint Clair et al.
2006/0074494 A1 4/2006 McFarland
2006/0145833 A1 7/2006 Brandt et al.
2006/0270440 A1 11/2006 Shearer et al.
2007/0008603 A1 1/2007 Sotzing et al.
2007/0042819 A1 2/2007 Li et al.
2007/0067048 A1 3/2007 Bechtel et al.
2007/0097481 A1 5/2007 Burdis et al.
2007/0115979 A1 5/2007 Balay et al.
2007/0126637 A1 6/2007 Habib et al.
2007/0182705 A1 8/2007 Leyland et al.
2007/0191074 A1 8/2007 Harrist et al.
2007/0222542 A1 9/2007 Joannopoulos et al.
2007/0292606 A1 12/2007 Demiryont

(56) References Cited

U.S. PATENT DOCUMENTS

2008/0018979 A1 1/2008 Mahe et al.
2008/0088821 A1 4/2008 Hurvitz et al.
2008/0177919 A1 7/2008 Miyazawa
2008/0182506 A1 7/2008 Jackson et al.
2008/0190759 A1 8/2008 Valentin et al.
2008/0277486 A1 11/2008 Seem et al.
2009/0014693 A1 1/2009 Zahn
2009/0047900 A1 2/2009 Cruz et al.
2009/0054054 A1 2/2009 Shao et al.
2009/0139052 A1 6/2009 Boenisch
2009/0140219 A1 6/2009 Zahn
2009/0163170 A1 6/2009 Norp et al.
2009/0189458 A1 7/2009 Kawasaki
2009/0210252 A1 8/2009 Silver
2009/0224980 A1 9/2009 Cruz et al.
2009/0231662 A1 9/2009 Sorensson et al.
2009/0284220 A1 11/2009 Toncich et al.
2009/0308933 A1 12/2009 Osada
2009/0322347 A1 12/2009 Hashimshony et al.
2009/0323161 A1 12/2009 Fuss et al.
2010/0027694 A1 2/2010 Touboul et al.
2010/0052718 A1 3/2010 Baker et al.
2010/0052844 A1 3/2010 Wesby
2010/0060971 A1 3/2010 Schwendeman et al.
2010/0076615 A1 3/2010 Daniel et al.
2010/0165436 A1 7/2010 Voss et al.
2010/0171667 A1 7/2010 Knudsen
2010/0188057 A1 7/2010 Tarng
2010/0210233 A1 8/2010 Cook et al.
2010/0243427 A1 9/2010 Kozlowski et al.
2010/0245973 A1 9/2010 Wang et al.
2010/0302624 A1 12/2010 Moskowitz
2010/0315693 A1 12/2010 Lam et al.
2011/0031821 A1 2/2011 Greene et al.
2011/0050756 A1 3/2011 Cassidy et al.
2011/0074342 A1 3/2011 MacLaughlin
2011/0080630 A1 4/2011 Valentin et al.
2011/0083152 A1 4/2011 Centore, III et al.
2011/0124313 A1 5/2011 Jones
2011/0148218 A1 6/2011 Rozbicki
2011/0159821 A1 6/2011 Park
2011/0170170 A1 7/2011 Boote
2011/0248901 A1 10/2011 Alexopoulos et al.
2011/0260856 A1 10/2011 Rossmann et al.
2011/0266137 A1 11/2011 Wang et al.
2011/0266138 A1 11/2011 Wang et al.
2011/0267674 A1 11/2011 Wang et al.
2011/0267675 A1 11/2011 Wang et al.
2011/0310519 A1 12/2011 Baba et al.
2012/0032855 A1 2/2012 Reede et al.
2012/0033287 A1 2/2012 Friedman et al.
2012/0039526 A1 2/2012 Garaas et al.
2012/0062975 A1 3/2012 Mehtani et al.
2012/0112883 A1 5/2012 Wallace et al.
2012/0133213 A1 5/2012 Borke et al.
2012/0133315 A1 5/2012 Berman et al.
2012/0143516 A1 6/2012 Mezic et al.
2012/0154241 A1 6/2012 Tatarnikov et al.
2012/0188627 A1 7/2012 Chen et al.
2012/0194895 A1 8/2012 Podbelski et al.
2012/0212794 A1 8/2012 Giron et al.
2012/0217346 A1 8/2012 Eberle et al.
2012/0239209 A1 9/2012 Brown et al.
2012/0268369 A1 10/2012 Kikkeri
2012/0275008 A1 11/2012 Pradhan et al.
2012/0287017 A1 11/2012 Parsche
2012/0296610 A1 11/2012 Hailemariam et al.
2012/0328849 A1 12/2012 Neill et al.
2013/0054033 A1 2/2013 Casilli
2013/0057937 A1 3/2013 Berman et al.
2013/0073681 A1 3/2013 Jiang et al.
2013/0130227 A1 5/2013 Peltz et al.
2013/0194141 A1 8/2013 Okajima et al.
2013/0226353 A1 8/2013 Park
2013/0243120 A1 9/2013 Tsai et al.
2013/0250422 A1 9/2013 Tandler
2013/0271814 A1 10/2013 Brown
2013/0277539 A1 10/2013 Smilansky et al.
2013/0306615 A1 11/2013 Rozbicki et al.
2014/0007244 A1 1/2014 Martin et al.
2014/0008992 A1 1/2014 Leabman
2014/0022621 A1 1/2014 Kailasam et al.
2014/0028551 A1 1/2014 Ruff et al.
2014/0101573 A1 4/2014 Kuo
2014/0149416 A1 5/2014 Wallace
2014/0171016 A1 6/2014 Sennett et al.
2014/0217967 A1 8/2014 Zeine et al.
2014/0236323 A1 8/2014 Brown et al.
2014/0240474 A1 8/2014 Kondo
2014/0243033 A1 8/2014 Wala et al.
2014/0247475 A1 9/2014 Parker et al.
2014/0249825 A1 9/2014 Proud
2014/0273911 A1 9/2014 Dunn et al.
2014/0300945 A1 10/2014 Parker
2014/0317514 A1 10/2014 Bokotey
2014/0319116 A1 10/2014 Fischer et al.
2014/0333485 A1 11/2014 Stone et al.
2014/0368048 A1 12/2014 Leabman et al.
2014/0368899 A1 12/2014 Greer
2015/0032264 A1 1/2015 Emmons et al.
2015/0070745 A1 3/2015 Pradhan
2015/0106121 A1 4/2015 Muhsin et al.
2015/0116811 A1 4/2015 Shrivastava et al.
2015/0122474 A1 5/2015 Petersen
2015/0155737 A1 6/2015 Mayo
2015/0195644 A1 7/2015 Wilson et al.
2015/0198640 A1 7/2015 Lee
2015/0222126 A1 8/2015 Leabman et al.
2015/0255651 A1 9/2015 Barr et al.
2015/0270823 A1 9/2015 Sobolewski
2015/0323287 A1 11/2015 Durand
2015/0323915 A1 11/2015 Warren et al.
2015/0327010 A1 11/2015 Gottschalk et al.
2015/0362819 A1 12/2015 Bjornard et al.
2015/0378715 A1 12/2015 Solnit et al.
2016/0020647 A1 1/2016 Leabman et al.
2016/0027391 A1 1/2016 Gibson et al.
2016/0028162 A1 1/2016 Ou et al.
2016/0071183 A1 3/2016 Joshi et al.
2016/0091769 A1 3/2016 Rozbicki
2016/0099757 A1 4/2016 Leabman et al.
2016/0124283 A1 5/2016 Brown et al.
2016/0134932 A1 5/2016 Karp et al.
2016/0135175 A1 5/2016 Tarlazzi
2016/0149635 A1 5/2016 Hinman et al.
2016/0154290 A1 6/2016 Brown et al.
2016/0170402 A1 6/2016 Lindström
2016/0181873 A1 6/2016 Mitcheson et al.
2016/0183056 A1 6/2016 Leabman
2016/0210711 A1 7/2016 Krupa et al.
2016/0231755 A1 8/2016 Ajax et al.
2016/0248270 A1 8/2016 Zeine et al.
2016/0261837 A1 9/2016 Thompson et al.
2016/0376831 A1 12/2016 Plummer
2017/0010880 A1 1/2017 Yamazaki
2017/0039339 A1 2/2017 Bitran et al.
2017/0052753 A1 2/2017 Paolini, Jr. et al.
2017/0068414 A1 3/2017 Plumb
2017/0075183 A1 3/2017 Brown
2017/0080341 A1 3/2017 Mao et al.
2017/0082903 A1 3/2017 Vigano et al.
2017/0085834 A1 3/2017 Kim et al.
2017/0086003 A1 3/2017 Rabinowitz et al.
2017/0104374 A1 4/2017 Zeine et al.
2017/0117754 A1 4/2017 Noori et al.
2017/0122802 A1 5/2017 Brown et al.
2017/0146884 A1 5/2017 Vigano et al.
2017/0161911 A1 6/2017 Kumar et al.
2017/0223312 A1 8/2017 McNelley et al.
2017/0248564 A1 8/2017 Miyajima
2017/0264865 A1 9/2017 Huangfu
2017/0272145 A1* 9/2017 Lilja .................... H01Q 1/1221
2017/0272317 A1 9/2017 Singla et al.
2017/0276542 A1 9/2017 Klawuhn et al.

(56) References Cited

U.S. PATENT DOCUMENTS

2017/0345267 A1 11/2017 Flint et al.
2017/0365908 A1* 12/2017 Hughes .................. H01Q 1/246
2017/0374255 A1 12/2017 Campbell et al.
2017/0374437 A1 12/2017 Schwarzkopf et al.
2018/0004059 A1 1/2018 Jovanovic
2018/0088432 A1 3/2018 Shrivastava et al.
2018/0090992 A1 3/2018 Shrivastava et al.
2018/0095337 A1 4/2018 Rozbicki et al.
2018/0119973 A1 5/2018 Rothman et al.
2018/0129172 A1 5/2018 Shrivastava et al.
2018/0130455 A1 5/2018 Plummer et al.
2018/0138576 A1 5/2018 Cohen
2018/0139517 A1 5/2018 Schwartz et al.
2018/0144696 A1 5/2018 Zhang et al.
2018/0153454 A1 6/2018 Hayter et al.
2018/0156484 A1 6/2018 Kim et al.
2018/0176799 A1 6/2018 Lange et al.
2018/0181085 A1 6/2018 Gabriel et al.
2018/0187478 A1 7/2018 Vigano et al.
2018/0187484 A1 7/2018 Hebeisen et al.
2018/0195752 A1 7/2018 Sasaki et al.
2018/0225585 A1 8/2018 Dong et al.
2018/0259373 A1 9/2018 Staton et al.
2018/0269974 A1 9/2018 Luciano
2018/0301783 A1 10/2018 Bulja et al.
2018/0306609 A1 10/2018 Agarwal et al.
2018/0307114 A1 10/2018 Brown et al.
2018/0321042 A1 11/2018 Brewer et al.
2018/0324696 A1 11/2018 Subramanian et al.
2018/0349710 A1 12/2018 Houri et al.
2018/0364654 A1 12/2018 Locke et al.
2019/0025661 A9 1/2019 Brown et al.
2019/0036209 A1* 1/2019 Au .......................... H01Q 1/44
2019/0044606 A1 2/2019 Mansikkamaki
2019/0049812 A1 2/2019 Brown
2019/0058977 A1 2/2019 Gherardi et al.
2019/0067826 A1 2/2019 Achour et al.
2019/0097827 A1 3/2019 Angle et al.
2019/0130189 A1 5/2019 Zhou et al.
2019/0155122 A1 5/2019 Brown et al.
2019/0178511 A1 6/2019 Zimmerman et al.
2019/0205774 A1 7/2019 Ba et al.
2019/0219881 A1 7/2019 Shrivastava et al.
2019/0229768 A1 7/2019 Jeremy et al.
2019/0257143 A1 8/2019 Nagel et al.
2019/0267840 A1 8/2019 Rozbicki et al.
2019/0294018 A1 9/2019 Shrivastava et al.
2019/0317458 A1 10/2019 Shrivastava et al.
2019/0319335 A1 10/2019 Hughes et al.
2019/0324341 A1 10/2019 Tonar et al.
2019/0324431 A1 10/2019 Cella et al.
2019/0346417 A1 11/2019 Benefield
2019/0354071 A1 11/2019 Turney et al.
2019/0356508 A1 11/2019 Trikha et al.
2020/0026141 A1 1/2020 Brown et al.
2020/0033163 A1 1/2020 Agarwal et al.
2020/0041967 A1 2/2020 Shrivastava et al.
2020/0045261 A1 2/2020 Lim et al.
2020/0090089 A1 3/2020 Aston et al.
2020/0096775 A1 3/2020 Franklin et al.
2020/0103841 A1 4/2020 Pillai et al.
2020/0176125 A1 6/2020 Chatterjea et al.
2020/0193155 A1 6/2020 Keohane et al.
2020/0193206 A1 6/2020 Turkelson et al.
2020/0200416 A1 6/2020 Granger et al.
2020/0227159 A1 7/2020 Boisvert et al.
2020/0259237 A1 8/2020 Shrivastava et al.
2020/0321682 A1 10/2020 Hughes et al.
2021/0021788 A1 1/2021 McNelley et al.
2021/0040789 A1 2/2021 Rozbicki et al.
2021/0063836 A1 3/2021 Patterson et al.
2021/0119318 A1 4/2021 Hughes et al.
2021/0132458 A1 5/2021 Trikha et al.
2021/0191214 A1 6/2021 Rozbicki et al.
2021/0210053 A1 7/2021 Ng et al.
2021/0225528 A1 7/2021 Viengkham et al.
2021/0375440 A1 12/2021 Schlameuss et al.
2021/0376445 A1 12/2021 Shrivastava et al.
2021/0383804 A1 12/2021 Makker et al.
2021/0384764 A1 12/2021 Shrivastava et al.
2021/0390953 A1 12/2021 Makker et al.
2021/0398691 A1 12/2021 Dhamija et al.
2022/0019117 A1 1/2022 Shrivastava et al.
2022/0021099 A1 1/2022 Shrivastava et al.
2022/0044673 A1 2/2022 Park et al.
2022/0231399 A1 7/2022 Brown et al.
2022/0252952 A1 8/2022 Rozbicki et al.
2022/0255351 A1 8/2022 Rozbicki et al.
2022/0386414 A1 12/2022 Bush et al.
2023/0040424 A1 2/2023 Gopinathanasari et al.
2023/0065864 A1 3/2023 Trikha et al.
2023/0074720 A1 3/2023 Brown et al.
2023/0152652 A1 5/2023 Trikha et al.
2023/0176669 A1 6/2023 Gupta et al.
2023/0194115 A1 6/2023 Malik et al.
2023/0230686 A1 7/2023 Schlameuss et al.
2023/0261358 A1 8/2023 Hughes et al.
2023/0288770 A1 9/2023 Gupta et al.
2023/0333434 A1 10/2023 Gupta et al.
2023/0353416 A1 11/2023 Trikha et al.
2023/0367584 A1 11/2023 Tai et al.
2024/0085754 A1 3/2024 Martinson et al.
2024/0192563 A1 6/2024 Hur et al.
2024/0201314 A1 6/2024 Gomez-Martinez et al.
2024/0242717 A1 7/2024 Makker et al.
2024/0276204 A1 8/2024 Lee et al.
2024/0284155 A1 8/2024 Lee et al.
2024/0329484 A1 10/2024 Trikha et al.

FOREIGN PATENT DOCUMENTS

CN 1267416 A 9/2000
CN 1276574 A 12/2000
CN 1599280 A 3/2005
CN 101032052 A 9/2007
CN 101401312 A 4/2009
CN 101868346 A 10/2010
CN 102255119 A 11/2011
CN 102325326 A 1/2012
CN 102326164 A 1/2012
CN 103119845 A 5/2013
CN 103168269 A 6/2013
CN 203019761 U 6/2013
CN 103649826 A 3/2014
CN 103793730 A 5/2014
CN 104102060 A 10/2014
CN 104321497 A 1/2015
CN 104884248 A 9/2015
CN 106125442 A 11/2016
CN 106364442 A 2/2017
CN 104730795 B 5/2018
CN 110515425 A 11/2019
CN 107112620 B 12/2019
EP 0413580 A1 2/1991
EP 0588514 A1 3/1994
EP 0917667 A1 5/1999
EP 1297380 B1 11/2008
EP 2090961 A1 8/2009
EP 2645474 A1 10/2013
EP 2733998 A1 5/2014
EP 2851993 A1 3/2015
EP 3299957 A1 3/2018
EP 3328000 A1 5/2018
JP S63271320 A 11/1988
JP H0611477 A 1/1994
JP H06308073 A 11/1994
JP H10233612 A 9/1998
JP 2000165970 A 6/2000
JP 2001196826 A 7/2001
JP 2004001765 A 1/2004
JP 2005303348 A 10/2005
JP 2006252886 A 9/2006
JP 2009005116 A 1/2009
JP 2013515457 A 5/2013

(56) References Cited

FOREIGN PATENT DOCUMENTS

| | | | |
|---|---|---|---|
| JP | 2014121122 | A | 6/2014 |
| JP | 5556044 | B2 | 7/2014 |
| JP | 5564620 | B2 | 7/2014 |
| JP | 2014204550 | A | 10/2014 |
| JP | 2015128349 | A | 7/2015 |
| JP | 2015521459 | A | 7/2015 |
| JP | 2016512677 | A | 4/2016 |
| JP | 2019508946 | A | 3/2019 |
| KR | 20080068165 | A | 7/2008 |
| KR | 20110128213 | A | 11/2011 |
| KR | 20120092921 | A | 8/2012 |
| KR | 101346862 | B1 | 1/2014 |
| KR | 20150001549 | A | 1/2015 |
| KR | 20170121858 | A | 11/2017 |
| KR | 20170134321 | A | 12/2017 |
| KR | 20180012615 | A | 2/2018 |
| KR | 101853568 | B1 | 4/2018 |
| KR | 20190142032 | A | 12/2019 |
| KR | 20210032133 | A | 3/2021 |
| KR | 20210039721 | A | 4/2021 |
| SG | 141352 | A1 | 4/2008 |
| TW | 201135545 | A | 10/2011 |
| TW | 201243470 | A | 11/2012 |
| TW | 201344874 | A | 11/2013 |
| TW | 201423773 | A | 6/2014 |
| TW | M519749 | U | 4/2016 |
| TW | I607269 | B | 12/2017 |
| WO | WO-9823116 | A2 | 5/1998 |
| WO | WO-0182410 | A1 | 11/2001 |
| WO | WO-02054086 | A1 | 7/2002 |
| WO | WO-03037056 | A1 | 5/2003 |
| WO | WO-2008073372 | A2 | 6/2008 |
| WO | WO-2010014648 | A1 | 2/2010 |
| WO | WO-2010079388 | A1 | 7/2010 |
| WO | WO-2010106648 | A1 | 9/2010 |
| WO | WO-2011082208 | A2 | 7/2011 |
| WO | WO-2011087726 | A2 | 7/2011 |
| WO | WO-2012130262 | A1 | 10/2012 |
| WO | WO-2013121103 | A1 | 8/2013 |
| WO | WO-2013155467 | A1 | 10/2013 |
| WO | WO-2013158365 | A1 | 10/2013 |
| WO | WO-2013158464 | A1 | 10/2013 |
| WO | WO-2013159778 | A1 | 10/2013 |
| WO | WO-2014007487 | A1 | 1/2014 |
| WO | WO-2014032023 | A1 | 2/2014 |
| WO | WO-2014209812 | A1 | 12/2014 |
| WO | WO-2015013578 | A1 | 1/2015 |
| WO | WO-2015075007 | A1 | 5/2015 |
| WO | WO-2015077829 | A1 | 6/2015 |
| WO | WO-2015100419 | A1 | 7/2015 |
| WO | WO-2015113592 | A1 | 8/2015 |
| WO | WO-2016044187 | A1 | 3/2016 |
| WO | WO-2016054112 | A1 | 4/2016 |
| WO | WO-2016072620 | A1 | 5/2016 |
| WO | WO-2016085964 | A1 | 6/2016 |
| WO | WO-2016153467 | A1 | 9/2016 |
| WO | WO-2016174228 | A1 | 11/2016 |
| WO | WO-2017007841 | A1 | 1/2017 |
| WO | WO-2017058568 | A1 | 4/2017 |
| WO | WO-2017062915 | A1 | 4/2017 |
| WO | WO-2017075472 | A1 | 5/2017 |
| WO | WO-2017120262 | A1 | 7/2017 |
| WO | WO-2017129855 | A1 | 8/2017 |
| WO | WO-2017182920 | A1 | 10/2017 |
| WO | WO-2017189618 | A1 | 11/2017 |
| WO | WO-2017192881 | A1 | 11/2017 |
| WO | WO-2018039080 | A1 | 3/2018 |
| WO | WO-2018063919 | A1 | 4/2018 |
| WO | WO-2018094203 | A1 | 5/2018 |
| WO | WO-2018098089 | A1 | 5/2018 |
| WO | WO-2018102103 | A1 | 6/2018 |
| WO | WO-2018200702 | A1 | 11/2018 |
| WO | WO-2018200740 | A2 | 11/2018 |
| WO | WO-2018200752 | A1 | 11/2018 |
| WO | WO-2019022129 | A1 | 1/2019 |
| WO | WO-2019178282 | A1 | 9/2019 |
| WO | WO-2019204205 | A1 | 10/2019 |
| WO | WO-2019213441 | A1 | 11/2019 |
| WO | WO-2020146766 | A1 | 7/2020 |
| WO | WO-2020227702 | A2 | 11/2020 |
| WO | WO-2020227702 | A3 | 1/2021 |
| WO | WO-2021211798 | A1 | 10/2021 |

OTHER PUBLICATIONS

AU Office action dated Apr. 4, 2023, in AU Application No. AU2022202275.

AU Office Action dated Aug. 30, 2022, in Application No. AU20210250838.

CA Office Action dated Aug. 15, 2023, in Application No. CA2968665.

CA Office Action dated Dec. 27, 2023 in CA Application No. 3172227.

CA Office Action dated Jan. 11, 2024 in CA Application No. 3038974.

CA Office Action dated Jan. 26, 2024 in CA Application No. CA3167832.

CA Office Action dated Jun. 1, 2023, in Application No. CA3023072.

CA Office Action dated Nov. 9, 2023, in CA Application No. 3139813.

CA Office Action dated Nov. 15, 2022 in Application No. CA2968665.

CA Office Action dated Oct. 11, 2023 in CA Application No. CA3169935.

CA Office Action dated Oct. 25, 2023, in Application No. CA3169929.

CA Office Action dated Sep. 1, 2023, in Application No. CA3034630.

CA Office Action dated Sep. 27, 2023, in Application No. CA3103480.

Chan, E.C.L, et al., "Effect of Channel Interference on Indoor Wireless Local Area Network Positioning" IEEE 6th International Conference on Wireless and Mobile Computing, Networking and Communications, Oct. 11, 2010, pp. 239-245.

CN Office Action dated Apr. 15, 2022 in CN Application No. 201780063202.2 with English translation.

CN Office Action dated Apr. 27, 2022, in Application No. CN201780057293.9 with English translation.

CN Office Action dated Aug. 17, 2023, in Application No. CN202111203764.7 with English translation.

CN Office Action dated Aug. 2, 2021, in CN Application No. 201780038353.2 with English translation.

CN Office Action dated Jan. 15, 2024 in CN Application No. CN202011606768.5.

CN Office Action dated Mar. 2, 2022 in Application No. CN201980042340.1 with English translation.

CN Office Action dated Nov. 2, 2022, in ApplicationNo. CN201980042340.1 with English translation.

CN Office Action dated Oct. 10, 2022, in Application No. CN201780057293.9, with EnglishTranslation.

CN Office Action dated Sep. 15, 2021, in application No. CN201911227990.1 with English translation.

CN Office Action dated Sep. 26, 2023, in CN Application No. 202080060919.3 with English Translation.

EP Extended European Search report dated May 26, 2023, in Application No. EP23153638.4.

EP Office action dated Jan. 10, 2022, in Application No. EP19745809. 4.

EP Office Action dated Jan. 19, 2024 in EP Application No. 20746440.5.

EP Office Action dated Jun. 3, 2022, in Application No. EP19713970. 2.

EP office action dated Jun. 21, 2023, in application No. EP20200757159.

EP Office action dated May 16, 2023, in Application No. EP19745809. 4.

IN Office Action dated Dec. 5, 2022 in Application No. IN202238032780.

IN Office Action dated May 10, 2022, in Application No. IN202037043494.

IN Office Action dated May 29, 2023, in Application No. IN202118042940.

IN Office Action dated Sep. 13, 2022, in Application No. IN202037054068.

(56) References Cited

OTHER PUBLICATIONS

International Preliminary Report on Patentability and written opinion dated Jul. 21, 2022 in Application PCT/US2021/012313.
International Preliminary Report on Patentability dated Oct. 6, 2022 in PCT Application PCT/US2021/023433.
International Search Report and Written Opinion dated Aug. 2, 2022 in Application No. PCT/US2022/030757.
International Search Report and Written Opinion dated Aug. 22, 2022 in Application No. PCT/US2022/024343.
International Search Report and Written Opinion dated Mar. 25, 2022 in Application No. PCT/US2021/062774.
International Search Report and Written Opinion dated Sep. 26, 2022 in Application No. PCT/US2022/032993.
International Preliminary Report on Patentability and Written Opinion dated Dec. 7, 2023 in PCT Application No. PCT/US2022/030757.
International Preliminary Report on Patentability and Written Opinion dated Dec. 21, 2023 in PCT Application No. PCT/US2022/032993.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Aug. 11, 2022 in PCT Application No. PCT/US2021/015378.
International Preliminary Report on Patentability dated Dec. 1, 2022, in PCT Application No. PCT/US2021/033544.
International Preliminary Report on Patentability dated Feb. 9, 2023 in PCT Application No. PCT/US2021/043143.
International Preliminary Report on Patentability dated Feb. 10, 2022 issued in Application No. PCT/US2020/044337.
International Preliminary Report on Patentability dated Jun. 22, 2023, in Application No. PCT/US2021/062774.
International Preliminary Report on Patentability dated Mar. 9, 2023 in PCT Application No. PCT/US2021/046838.
International Preliminary Report on Patentability dated Oct. 19, 2023, in PCT Application No. PCT/US2022/023605.
International Preliminary Report on Patentability dated Oct. 26, 2023, in Application No. PCT/US2022/024343.
International Preliminary Report on Patentability dated Oct. 26, 2023, in Application No. PCT/US2022/024812.
International Preliminary Report on Patentability dated Oct. 27, 2022, in PCT Application No. PCT/US2021/027418.
International Preliminary Reporton Patentability dated Apr. 13, 2023 in PCT Application No. No. PCT/US2021/052587.
International Preliminary Reporton Patentability dated Sep. 28, 2023, in PCT Application No. PCT/US2022/020730.
International Search Report and Written Opinion dated Aug. 8, 2022, in Application No. PCT/US2022/023605.
International Search Report and Written Opinion dated Jan. 15, 2024 in PCT Application No. PCT/US2023/074952.
International Search Report and Written Opinion dated Jan. 17, 2022 in PCT Application No. PCT/US2021/046838.
International Search Report and Written Opinion dated Jul. 6, 2022, in PCT Application No. PCT/US2022/020730.
International Search Report and Written Opinion dated Jul. 26, 2022 in Application No. PCT/US2022/024999.
International Search Report and Written Opinion dated Jun. 23, 2021 in PCT Application No. PCT/US2021/015378.
International Search Report and Written Opinion dated Mar. 8, 2022 in PCT Application No. PCT/US2021/052587.
International Search Report and Written Opinion dated Nov. 10, 2021 in PCT Application No. PCT/US2021/043143.
International Search Report and Written Opinion dated Nov. 16, 2022 in PCT Application No. PCT/US2022/074162.
International Search Report and Written Opinion dated Sep. 1, 2022, in Application No. PCT/US2022/024812.
International Search Report and Written Opinion dated Sep. 1, 2022 in Application No. PCT/US2022/028850.
International Search Report and Written Opinion dated Sep. 3, 2021 in PCT Application No. PCT/US2021/033544.
JP Office Action dated Dec. 20, 2022 in JP Application No. JP2020-570981 with English translation.
JP Office Action dated Jul. 5, 2022, in Application No. JP2021-119155 with English translation.
JP Office Action dated Nov. 8, 2022 for JP Application No. 2021-119155 with English translation.
KR Office Action dated Aug. 2, 2023, in Application No. KR10-2022-7042723 with English translation.
KR Office Action dated Dec. 7, 2022, in Application No. KR10-2022-7005495 WithEnglish translation.
KR Office Action dated Feb. 22, 2022, in Application No. KR1020177017285 with English translation.
KR Office Action dated May 25, 2022, in Application No. KR1020227005495 With English Translation.
Rajiv, "How does Cloud Radio Access Network (C-RAN) works," RF Page, Apr. 16, 2018, 5 pp. https://www.rfpage.com/how-cloud-radio-access-network-works/ Accessed May 19, 2021.
"Remote Radio Head for CPRI and 4G, 5G & LTE Networks," CableFree by Wireless Excellence Limited, 2020, 8 pp., https://www.cablefree.net/wirelesstechnology/4glte/remote-radio-head/ Accessed May 19, 2021.
TW Office Action dated Apr. 26, 2022 in Application No. TW110144841 with English translation.
TW Office Action dated Apr. 27, 2023, in application No. TW20220142122 with Englishtranslation.
TW Office Action dated Feb. 16, 2023, in Application No. TW108121734 with English translation.
TW Office Action dated Jul. 11, 2022 In Application No. TW110146990 with English translation.
TW Office Action dated Jul. 14, 2022, in Application No. TW108121734 with English translation.
TW Office Action dated Mar. 13, 2022, in Application No. TW106114947 with English translation.
TW Office Action dated Mar. 15, 2022, in Application No. TW109112242 with Englishtranslation.
TW Office Action dated May 31, 2023 in Application No. TW111144104 with English translation.
TW Office Action dated Nov. 29, 2021, in Application No. TW109134283 with English translation.
U.S Advisory Action dated Aug. 31, 2022 in U.S. Appl. No. 16/447,169.
U.S. Advisory Action dated Apr. 29, 2022 in U.S. Appl. No. 17/328,346.
U.S. Advisory Action dated Dec. 15, 2021 in U.S. Appl. No. 16/447,169.
U.S Advisory Action dated Jan. 22, 2023 in U.S. Appl. No. 16/550,052.
U.S Corrected Notice of Allowance dated Apr. 26, 2022 in U.S. Appl. No. 16/334,716.
U.S. Corrected Notice of Allowance dated Feb. 15, 2023 in U.S. Appl. No. 16/949,978.
U.S. Corrected Notice of Allowance dated Jul. 17, 2023, in U.S. Appl. No. 16/980,305.
U.S. Corrected Notice of Allowance dated Jun. 3, 2022 In U.S. Appl. No. 16/849,540.
U.S. Corrected Notice of Allowance dated Sep. 6, 2022 in U.S. Appl. No. 16/849,540.
U.S. Final office Action dated Dec. 1, 2021 in U.S. Appl. No. 17/328,346.
U.S. Final Office Action dated Dec. 2, 2022 in U.S. Appl. No. 16/550,052.
U.S. Final Office Action dated Dec. 28, 2023 in U.S. Appl. No. 17/385,810.
U.S. Final Office Action dated Jun. 24, 2022, in U.S. Appl. No. 16/447,169.
U.S. Final Office Action dated Nov. 15, 2023 in U.S. Appl. No. 17/609,671.
U.S. Non Final Office Action dated Jan. 31, 2022 in U.S. Appl. No. 16/849,540.

(56) References Cited

OTHER PUBLICATIONS

U.S. Non Final office Action dated Sep. 2, 2021 in U.S. Appl. No. 17/328,346.
U.S. Non-Final office Action dated Jul. 22, 2022 in U.S. Appl. No. 17/328,346.
U.S. Non-Final office Action dated Nov. 15, 2022 in U.S. Appl. No. 16/447,169.
U.S. Non-Final Office Action dated Apr. 18, 2023 in U.S. Appl. No. 17/609,671.
U.S. Non-Final Office Action dated Apr. 25, 2023 in U.S. Appl. No. 16/550,052.
U.S. Non-Final Office Action dated Aug. 24, 2023 in U.S. Appl. No. 17/656,612.
U.S. Non-Final Office Action dated Dec. 2, 2022 in U.S. Appl. No. 16/980,305.
U.S. Non-Final Office Action dated Jan. 24, 2024 in U.S. Appl. No. 17/609,671.
U.S. Non-Final Office Action dated Jul. 3, 2023, in U.S. Appl. No. 17/385,810.
U.S. Non-Final Office Action dated Mar. 1, 2023 in U.S. Appl. No. 17/380,785.
U.S. Non-Final Office Action dated Mar. 25, 2022, in U.S. Appl. No. 16/550,052.
U.S. Non-Final Office Action dated May 9, 2023 in U.S. Appl. No. 17/307,848.
U.S. Non-Final Office Action dated Nov. 18, 2022, in U.S. Appl. No. 17/307,848.
U.S. Non-Final Office Action dated Oct. 5, 2023, in U.S. Appl. No. 18/115,694.
U.S. Non-Final office Action dated Sep. 8, 2022 in U.S. Appl. No. 17/406,301.
U.S. Non-Final office Action dated Sep. 29, 2022 in U.S. Appl. No. 16/949,978.
U.S. Notice of Allowance dated Jan. 9, 2023 in U.S. Appl. No. 17/328,346.
U.S. Notice of Allowance dated Apr. 12, 2023 in U.S. Appl. No. 16/447,169.
U.S. Notice of Allowance dated Aug. 31, 2023, in U.S. Appl. No. 17/380,785.
U.S. Notice of Allowance dated Feb. 1, 2023 in U.S. Appl. No. 16/949,978.
U.S. Notice of Allowance dated Jan. 17, 2023 in U.S. Appl. No. 17/406,301.
U.S. Notice of Allowance dated Jan. 25, 2023 in U.S. Appl. No. 17/406,301.
U.S. Notice of Allowance dated Jul. 13, 2023 in U.S. Appl. No. 16/447,169.
U.S. Notice of Allowance dated May 11, 2023 in U.S. Appl. No. 16/949,978.
U.S. Notice of Allowance dated May 24, 2023 in U.S. Appl. No. 16/980,305.
U.S. Notice of Allowance dated May 26, 2022, in U.S. Appl. No. 16/849,540.
U.S. Notice of Allowance dated Sep. 18, 2023, in U.S. Appl. No. 17/380,785.
U.S. Notice of Allowance dated Sep. 19, 2023, in U.S. Appl. No. 16/550,052.
U.S. Appl. No. 17/791,507, inventors Gopinathanasari et al., filed Jul. 7, 2022.
U.S. Appl. No. 17/910,722, inventor Trikha et al., filed Sep. 9, 2022.
U.S. Appl. No. 17/916,986, inventors Makker et al., filed Oct. 4, 2022.
U.S. Appl. No. 18/028,292, inventors Martinson et al., filed Mar. 24, 2023.
U.S. Appl. No. 18/037,067, inventors Tai et al., filed May 15, 2023.
U.S. Appl. No. 18/138,846, inventors Hughes H., et al., filed Apr. 25, 2023.
U.S. Appl. No. 18/281,913 inventors Trikha N, etal, filed Sep. 13, 2023.
U.S. Appl. No. 18/286,521, inventors Rasmus et al., filed Oct. 11, 2023.
U.S. Appl. No. 18/555,129, inventors MakkerT, et al., filed Oct. 12, 2023.
U.S. Appl. No. 18/555,275, inventors Hur Yerang et al., filed Oct. 13, 2023.
U.S. Appl. No. 18/565,563, inventors Gomez-Martinez F V, et al., filed Nov. 30, 2023.
U.S. Restriction requirement dated Mar. 15, 2023 in U.S. Appl. No. 17/385,810.
AGC, Inc., "AGC completes development of 5G-compatible 'Glass Antenna that adds cellular base station capabilities to windows,'" Press Release, Jun. 3, 2020, 2 pp.
AU examination report dated Oct. 1, 2021, in application No. AU2020220165.
Australian Office Action dated Apr. 8, 2020 in AU Application No. 2015353606.
Australian Office Action dated Aug. 20, 2019 in AU Application No. 2015353606.
Australian Office Action dated Feb. 19, 2021 in AU Application No. 2017260101.
Australian Office Action dated Jun. 3, 2021 in AU Application No. AU 2020220165.
Australian Office Action dated Mar. 4, 2020 in AU Application No. 2015353606.
Australian Office Action dated May 10, 2019 in AU Application No. 2015353606.
Azini, A.S. et al., "Transparent Antenna Design for Wireless Access Point Application," Piers Proceedings, Taipei, Mar. 25-28, 2013, pp. 910-913.
Balzano Q., et al., "RF Energy in Cars From Window-mounted Antennas", 36th IEEE Vehicular Technology Conference, 2006, pp. 32-39.
CA Office Action dated Dec. 22, 2021, in Application No. 2968665.
CN Office Action dated Apr. 29, 2020 in CN Application No. 201780038353.2.
CN Office Action dated Apr. 6, 2021 in CN Application No. 201780038353.2.
CN Office Action dated Apr. 6, 2021 in CN Application No. 201911227990.1.
CN Office Action dated Aug. 2, 2021, in CN Application No. 201780038353.2.
CN Office Action dated Aug. 3, 2021 in CN Application No. 201780063202.2.
CN Office Action dated Aug. 6, 2019 in CN Application No. 201580070207.9.
CN Office Action dated Jul. 28, 2021, in CN Application No. 201780057293.9.
CN Office Action dated Mar. 5, 2019 in CN Application No. 201580070207.9.
CN Office Action dated Nov. 6, 2020 in CN Application No. 201780038353.2.
CN Office Action dated Oct. 22, 2020 in CN Application No. 201911227990.1.
CN Office Action dated Sep. 15, 2021, in application No. CN201911227990.1.
Density DPU Technical Specifications v1.0, Density, 2018, downloaded from www.density.io.
Dols, W. Stuart, et al., A tool to model the fate and transport of indoor microbiological aerosols (FaTIMA), NIST Technical Note 2095, National Institute of Standards and Technology, US Department of Commerce, Jun. 2020, 32 pp. https://doi.org/10.6028/NIST.TN.2095.
EP Extended Search Report dated Dec. 4, 2019 in EP Application No. 17793364.5.
EP Extended Search Report dated Feb. 25, 2020 in EP Application No. 17844188.7.
EP Extended Search Report dated Mar. 31, 2020 in EP Application No. 17857230.1.
EP Extended Search Report dated Sep. 6, 2018 in EP Application No. 15863433.7.
EP Office Action dated Dec. 16, 2021, in Application No. EP17793364.5.

(56) References Cited

OTHER PUBLICATIONS

EP Office Action dated Oct. 1, 2021, in application No. EP17857230.1.
EP Partial Supplementary Search Report dated May 23, 2018 in EP Application No. 15863433.7.
European Office Action dated Jul. 8, 2020 in EP Application No. 15863433.7.
European Office Action dated May 7, 2021 in EP Application No. 15863433.7.
European Office Action dated Oct. 17, 2019 in EP Application No. 15863433.7.
"Halio Rooftop Sensor Kit (Model SR500)," Product Data Sheet, Kinestral Technologies, 2020, 4 pp.
IN Office Action dated Dec. 24, 2021, in Application No. IN202138004005.
Indian Office Action dated Mar. 24, 2021 in IN Application No. 201817042545.
Indian Office Action dated Sep. 25, 2020 in IN Application No. 201737018864.
International Preliminary Report on Patentability dated Apr. 11, 2019 in PCT/US2017/052798.
International Preliminary Report on Patentability dated Dec. 9, 2021, in PCT Application No. PCT/US2020/035485.
International Preliminary Report on Patentability dated Dec. 22, 2020 in PCT/US2019/038429.
International Preliminary Report on Patentability dated Jun. 8, 2017 in PCT Application No. PCT/US2015/062387.
International Preliminary Report on Patentability dated Mar. 7, 2019 in PCT/US2017/047664.
International Preliminary Report on Patentability dated Nov. 15, 2018 in PCT Application No. PCT/US2017/031106.
International Preliminary Report on Patentability dated Nov. 18, 2021, issued in PCT/US2020/032269.
International Preliminary Report on Patentability dated Sep. 24, 2020 in PCT/US2019/022129.
International Search Report and Written Opinion dated Sep. 16, 2019 in PCT/US2019/038429.
International Search Report and Written Opinion (ISA/EP) dated Dec. 7, 2020 in PCT Application No. PCT/US2020/032269.
International Search Report and Written Opinion (ISA/EP) dated May 9, 2019 in PCT/US2019/022129.
International Search Report and Written Opinion (ISA/EP) dated Sep. 30, 2020 in PCT Application No. PCT/US2020/035485.
International Search Report and Written Opinion (ISA/KR) dated Aug. 22, 2017 in PCT Application No. PCT/US2017/031106.
International Search Report and Written Opinion (ISA/KR) dated Aug. 5, 2021 in PCT Application No. PCT/US2021/027418.
International Search Report and Written Opinion (ISA/KR) dated Dec. 13, 2017 in PCT/US2017/047664.
International Search Report and Written Opinion (ISA/KR) dated Feb. 6, 2018 in PCT/US2017/052798.
International Search Report and Written Opinion (ISA/KR) dated Mar. 8, 2016 in PCT Application No. PCT/US2015/062387.
Joseph, J., "Xiaomi shows off near perfect Under Screen Camera Technology," Gizchina.com, Aug. 28, 2020, 7 pp., https://www.gizmochina.com/2020/08/28/xiaomi-perfected-third-gen-under-screen-camera-technology-prototype/, retrieved Apr. 21, 2021.
JP Office Action dated Mar. 2, 2021 in JP Application No. 2018-557808.
KR Office Action dated Apr. 16, 2021 in KR Application No. 10-2018-7035235.
Pasternack Enterprises, Inc. Technical Data Sheet for MCX Jack Connector Solder Attachment Surface Mount PCB (PE4889), 2013, 2 pp.
PCT Application No. PCT/US2021/012313 filed Jan. 6, 2021.
PCT Application No. PCT/US2021/015378 filed Jan. 28, 2021.
PCT Application No. PCT/US2021/023433 filed Mar. 23, 2021.
PCT Application No. PCT/US2021/030798 filed May 5, 2021.
PCT Application No. PCT/US2021/052587 filed Sep. 29, 2021.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Restriction requirement dated Oct. 18, 2021, for U.S. Appl. No. 16/849,540.
Rolith Inc., "NanoWeb: sub-micron transparent metal mesh conductors," [http://www.rolith.com/applications/transparent-conductive-electrodes] retrieved Jan. 29, 2016, 3 pp.
Saad, A. "Printed millimeter-wave MIMO-based slot antenna arrays for 5G networks," AEU—International Journal of Electronics and Communications, vol. 99, Feb. 2019, pp. 59-69.
Saberin, J. R., "Optically Transparent Antennas for Small Satellites," University of Utah, Dept. of Electrical and Computer Engineering, Masters Thesis, Aug. 2010, 55 pp.
SunPartner Technologies web page, "Li-Fi", [http://sunpartnertechnologies.com/li-fi/]; 3 pages; retrieved Jan. 24, 2018.
SunPartner Technologies web page, "Smart Building-Cameleon", [http://sunpartnertechnologies.com/vitrage-intelligent/]; 3 pages; retrieved Jan. 24, 2018.
SunPartner Technologies web page, "Smart Building-Design Glass", [http://sunpartnertechnologies.com/vitrage-intelligent/]; 3 pages; retrieved Jan. 24, 2018.
SunPartner Technologies web page, "Smart Building-Vision Glass", [http://sunpartnertechnologies.com/vitrage-intelligent/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [http://sunpartnertechnologies.com/wp-content/uploads/2012/08/White_Paper_LiFi_26_02_2015.pdf].
Taiwan Office Action dated Dec. 31, 2020 issued in TW Application No. 106133563.
Taiwan Office Action dated Jan. 25, 2021 issued in TW Application No. 106128249.
Taiwanese First Office Action dated May 21, 2021 in TW 109134283.
Taiwanese Office Action dated Mar. 16, 2020 in TW Application No. 104139297.
Taiwanese Office Action dated Oct. 1, 2019 in TW Application No. 104139297.
"That's right, 5G could depend on Corning glass in your antenna," by Robert Triggs, Android Authority, Mar. 2, 2018, 5 pp.. [https://www.androidauthority.com/corning-glass-5g-antenna-842341/] downloaded Nov. 13, 2018.
TW Office Action dated May 31, 2021 in TW Application No. TW 106114947.
U.S. Appl. No. 16/550,052, inventors Brown et al., filed Aug. 23, 2019.
U.S. Appl. No. 62/958,653, inventors Gopinathanasari et al., filed Aug. 1, 2020.
U.S. Appl. No. 62/993,617, inventors Gupta et al., filed Mar. 23, 2020.
U.S. Appl. No. 63/020,819, inventors Gupta et al., filed May 6, 2020.
U.S. Appl. No. 63/029,301, inventors Gupta et al., filed May 22, 2020.
U.S. Appl. No. 63/033,474, inventors Gupta et al., filed Jun. 2, 2020.
U.S. Appl. No. 63/034,792, inventors Gupta et al., filed Jun. 4, 2020.
U.S. Appl. No. 63/041,002, inventors Gupta et al., filed Jun. 18, 2020.
U.S. Appl. No. 63/069,358, inventors Gupta et al., filed Aug. 24, 2020.
U.S. Appl. No. 63/079,851, inventors Gupta et al., filed Sep. 17, 2020.
U.S. Appl. No. 63/106,058, inventors Rasmus-Vorrath et al., filed Oct. 27, 2020.
U.S. Appl. No. 63/115,886, Inventors Gupta et al., filed Nov. 19, 2020.
U.S. Appl. No. 63/133,725, inventors Gopinathanasari et al., filed Jan. 4, 2021.
U.S. Appl. No. 63/159,814, Inventors Gupta et al., filed Mar. 11, 2021.
U.S. Appl. No. 63/173,759, inventors Rasmus-Vorrath et al., filed Apr. 12, 2021.

(56) References Cited

OTHER PUBLICATIONS

U.S. Appl. No. 63/209,362, Inventors Gomez-Martinez et al., filed Jun. 10, 2021.
U.S. Appl. No. 63/233,122, inventors Gupta et al., filed Aug. 13, 2021.
U.S. Corrected Notice of Allowability dated Jan. 10, 2022, in U.S. Appl. No. 16/334,716.
U.S. Corrected Notice of Allowability for U.S. Appl. No. 16/327,789 dated Mar. 1, 2021.
US Final Office Action dated Aug. 13, 2021 in U.S. Appl. No. 16/447,169.
US Final Office Action dated Feb. 6, 2020 in U.S. Appl. No. 16/451,784.
US Final Office Action dated Jan. 1, 2021 in U.S. Appl. No. 16/550,052.
US Final Office Action dated May 11, 2021 in U.S. Appl. No. 16/334,716.
US Final Office Action dated Oct. 28, 2021 in U.S. Appl. No. 16/550,052.
US Notice of Allowance dated Apr. 19, 2021 in U.S. Appl. No. 16/099,424.
U.S Notice of Allowance dated Dec. 22, 2021 in U.S. Appl. No. 16/334,716.
US Notice of Allowance dated May 25, 2021 in U.S. Appl. No. 15/709,339.
US Notice of Allowance dated May 26, 2020 in U.S. Appl. No. 16/451,784.
US Notice of Allowance dated Sep. 10, 2021, in the U.S. Appl. No. 15/709,339.
U.S. Notice of Allowance for U.S. Appl. No. 16/327,789 dated Feb. 4, 2021.
US Office Action dated Jan. 16, 2020 in U.S. Appl. No. 15/529,677.
US Office Action dated Jan. 21, 2021 in U.S. Appl. No. 15/709,339.
US Office Action dated Jan. 25, 2021 in U.S. Appl. No. 16/447,169.
US Office Action dated Jul. 25, 2019 in U.S. Appl. No. 15/529,677.
US Office Action dated May 5, 2021 in U.S. Appl. No. 16/550,052.
US Office Action dated Nov. 12, 2020 in U.S. Appl. No. 16/334,716.
US Office Action dated Sep. 18, 2020 in U.S. Appl. No. 16/550,052.
US Office Action dated Sep. 23, 2019 in U.S. Appl. No. 16/451,784.
U.S. Office Action for U.S. Appl. No. 16/327,789 dated Sep. 28, 2020.
U.S. Appl. No. 16/949,978, inventors Hughes, et al., filed Nov. 23, 2020.
U.S. Appl. No. 17/307,848, inventors Shrivastava et al., filed May 4, 2021.
U.S. Appl. No. 17/406,301, inventors Shrivastava et al., filed Aug. 19, 2021.
U.S. Appl. No. 62/102,515, inventors Nagar et al., filed Jan. 12, 2015.
U.S. Appl. No. 62/102,516, inventors Nagar et al., filed Jan. 12, 2015.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/171,871, inventors Gomez-Martinez et al., filed Apr. 7, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Pat. Appl. No. PCT/US2021/027418, inventors Makker et al., filed on Apr. 15, 2021.
U.S. Appl. No. 63/057,120, Inventors Gupta et al., filed Jul. 27, 2020.
U.S. Appl. No. 63/078,805, Inventors Gupta et al., filed Sep. 15, 2020.
U.S. Appl. No. 63/212,483, inventors Martinson et al., filed Jun. 18, 2021.
U.S. Appl. No. 63/246,770, Inventors Martinson et al., filed Sep. 21, 2021.
US Preliminary Amendment dated Apr. 6, 2020 in U.S. Appl. No. 16/550,052.
US Preliminary Amendment dated Nov. 13, 2019 in U.S. Appl. No. 16/447,169.
U.S. Appl. No. 63/080,899, inventor Makker et al., filed Sep. 21, 2020.
WeBoost Connect 3G Cell Phone Booster 472205 [https://store.weboost.com/products/connect-3g-directional] retrieved Apr. 1, 2016, 12 pp.
Yasin, T. et al., "A study on the efficiency of transparent patch antennas designed from conductive oxide films," IEEE International Symposium on Antennas and Propagation (APSURSI), Spokane, WA, Jul. 3-8, 2011, pp. 3085-3087.
Yasin, T., "Transparent antennas for solar cell integration," Utah State University, Dept. of Electrical Engineering, Doctoral Thesis, 2013, 98 pp.
CA Office Action dated Feb. 9, 2024 in CA Application No. 3173471.
CA Office Action dated Feb. 13, 2024 in CA Application No. 3173667.
CN Office Action dated Jan. 15, 2024 in CN Application No. CN202011606768.5, with English Translation.
CN Office Action dated Jun. 7, 2024 in CN Application No. 202011606768.5 with English translation.
EP Extended European Search report dated Apr. 2, 2024 in EP Application No. 21752901.5.
EP Extended European Search report dated Jun. 10, 2024 in EP Application No. 24161362.9.
EP Office Action dated Feb. 21, 2024 in EP Application No. 20729442.2.
EP Office Action dated Jul. 5, 2024, in EP Application No. 19745809.4.
International Preliminary Report on Patentability and Written Opinion dated Feb. 8, 2024 in PCT Application No. PCT/US2022/074162.
International Search Report and Written Opinion dated Apr. 17, 2024 in PCT Application No. PCT/US2023/084708.
JP Office Action dated Jun. 11, 2024 in JP Application No. 2021-564914, with English Translation.
KR Office Action dated Aug. 28, 2024 in KR Application No. 10-2021-7040307, with English Translation.
U.S. Advisory Action dated Mar. 13, 2024 in U.S. Appl. No. 17/385,810.
U.S. Non-Final Office Action dated Apr. 11, 2024 in U.S. Appl. No. 18/218,475.
U.S. Non-Final Office Action dated Feb. 23, 2024 in U.S. Appl. No. 17/313,760.
U.S. Non-Final Office Action dated Jun. 4, 2024 in U.S. Appl. No. 18/138,846.
U.S. Non-Final Office Action dated Jun. 12, 2024 in U.S. Appl. No. 17/300,303.
U.S. Non-Final Office Action dated Mar. 14, 2024 in U.S. Appl. No. 17/597,701.
U.S. Non-Final Office Action dated May 7, 2024 in U.S. Appl. No. 17/385,810.
U.S. Notice of Allowance dated Mar. 29, 2024 in U.S. Appl. No. 18/115,694.
U.S. Notice of Allowance dated May 10, 2024 in U.S. Appl. No. 17/609,671.
U.S. Notice of Allowance dated May 23, 2024 in U.S. Appl. No. 17/609,671.
U.S. Appl. No. 18/756,667, inventor Schlameuss E, filed Jun. 27, 2024.
U.S. Appl. No. 18/797,037, inventors Brown S.C, et al., filed Aug. 7, 2024.
U.S. Appl. No. 18/819,746, inventors Hughes H, et al., filed Aug. 29, 2024.
U.S. Restriction requirement dated Sep. 5, 2024 in U.S. Appl. No. 17/759,709.
U.S. Non-Final Office Action dated Sep. 26, 2024 in U.S. Appl. No. 18/555,129.

(56) References Cited

OTHER PUBLICATIONS

U.S. Notice of Allowance dated Oct. 1, 2024 in U.S. Appl. No. 17/385,810.
U.S. Notice of Allowance dated Sep. 26, 2024 in U.S. Appl. No. 18/218,475.
U.S. Notice of Allowance dated Sep. 30, 2024 in U.S. Appl. No. 17/597,701.
U.S. Restriction requirement dated Sep. 24, 2024 in U.S. Appl. No. 17/922,219.

* cited by examiner

BUILDING ANTENNA

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Certain disclosed embodiments provide antenna systems and/or window structures that allow high bandwidth wireless communication across windows in a building. These window antenna systems may provide through-glass wireless communication. Thus, individuals and/or systems outside a building can have wireless access via antenna systems inside a nearby building. In some cases, the antenna and window systems work in concert with, or as a partial replacement of, the infrastructure of cellular carriers. Examples of components sometimes included with the antenna systems include physical antennas, transceivers or radios, and casings configured to mount with mullions or other building structures that abut windows. In some cases, when mounted, the casings hold the antennas near or against windows. In some cases, the antenna systems work in concert with electrically switchable windows and/or windows with low emissivity coatings. In some cases, such windows are modified to facilitate transmission of electromagnetic energy from or to an antenna, and through the window.

The disclosed antenna systems may provide additional coverage (beyond that provided by the cellular carrier itself) in the interior of the building and/or provide or supplement the cellular carrier's ability to provide coverage and capacity outside the building, typically near to the building, e.g., within about one hundred meters of the building, sometimes within a line of sight. In some cases, a building outfitted with antenna systems as described herein can serve as a cellular tower. In some cases, a building outfitted with antenna systems as described herein can serve as a wireless relay or link to another building, such as a building that does not have a backhaul or other wired link to a cellular system.

High speed, high frequency communications protocols such as 5G face numerous challenges before they can be widely accepted and deployed. For example, compared to lower frequency communications bands, high frequency bands require more antennas and higher density of antennas. For example, it is estimated that to deploy a 5G cellular service in a given area will require over twice as many antennas as are required to provide the same level of cellular service for 4G. Some cellular antennas as described herein may be provided in a building or a portion of a building. One of the challenges is that higher frequency communications, e.g. 5G spectrum, although able to carry much more data and at higher rates, are often line of site because they are blocked or otherwise attenuated by physical obstructions.

For example, providing 5G coverage in an urban canyon, such as a street in major metropolitan area such as Manhattan, NY or Singapore may be contemplated; 5G service will require many antennas to provide adequate coverage and adequate capacity. There is insufficient public space such as telephone poles where a carrier could deploy antennas to provide adequate 5G coverage and capacity. Moreover, garnering access to so many disparate publicly deployed structures may be extremely expensive and/or difficult to achieve. Further, so many antennas deployed on so many exterior structures can be unsightly.

Using private buildings that line an urban canyon to provide locations for 5G antennas solves many of these challenges. But remaining issues include finding a location for the 5G antennas in and on such buildings. One option would be on the exterior of buildings, but this may present logistical barriers and aesthetic issues. Even within buildings placement and aesthetics are an issue, not to mention all the technical barriers to develop such technology.

Unfortunately, 5G and other high frequency protocols are susceptible to attenuation. A 5G communications protocol, particularly due to it use of high frequency bands such as in the range of about 6 to 30 GHz, may be particularly susceptible to attenuation. The attenuation may result from structures such as reinforced concrete in walls, aluminum coated thermal insulation in building walls and floors, low-E films on glass, and other passive or active layers on glass such as thermochromic, photochromic and electrochromic coatings on glass. Such coatings commonly include metals and metal oxides which may exhibit a high attenuation in wireless communication bands. With 4G, this is already a problem, and with the advent of 5G higher frequency bands, the problem is even worse. To address the attenuation issue, active elements such as repeaters may be provided in a building. For example, cellular repeaters may be disposed on or proximate to the walls, windows, floors, and/or ceilings that attenuate wireless signals. However, such repeaters are often relatively large and/or aesthetically unpleasing. They may also require undue modifications to building structural elements, making them difficult to deploy on a large scale.

SUMMARY

To address such issues, an antenna system may be employed to transceive (i.e., to transmit and/or receive) electromagnetic communications signals across a window with relatively little attenuation, even when implementing high frequency protocols such as 5G cellular. In some cases, this is accomplished, in part, by disposing antennas on or close to windows through which the electromagnetic signal will pass. In some cases, communication is further facilitated by selectively removing attenuating layers or materials on a window such as portions of a low emissivity coating and/or an optically switchable device such as an electrochromic device. The coating removal may be done via laser ablation, and e.g., after the window is installed. The resulting window may have attenuating coating removed only in a certain location of the window, such as at the edge of a window. In some cases, the material is removed to create a pattern of removed and unremoved material that allows passive modification of the electromagnetic energy passing through the window. For example, such pattern may be structured to focus, spread, direct, polarize, etc. the electromagnetic energy. As should be clear, the material selectively removed from the window is often an electrical conductor such as silver or indium tin oxide. Thus, the resulting pattern provides regions of uncoated insulator (glass, polymer, or other dielectric) through which electromagnetic signals can more easily pass.

Note that when describing the cellular protocols disclosed herein, 5G is frequently used as an example. However, the disclosed embodiments may pertain to any wireless communications protocol or combination of protocols.

In various aspects, the antenna systems and associated structures described herein are used with eletrochromic windows such as described in U.S. Provisional Patent Application No. 62/850,993, filed May 21, 2019, which is incorporated herein by reference in its entirety. In various aspects, the antenna systems and associated structures described herein are used with integrated glass units (IGUs), communications networks, power distribution systems, ancillary building services (e.g., heating ventilation and air condition (HVAC, lighting, and/or security systems), wireless communications systems, and/or occupant comfort systems such as also described in U.S. Provisional Patent Application No. 62/850,993.

According to some embodiments, a system for transceiving radio frequency (RF) signals includes (a) a window having a first surface facing, when installed in the building, an interior of the building and (b) an antenna arrangement configured to attach to a structure proximate to the first surface; wherein the antenna arrangement comprises one or more radiating elements configured to transceive the RF signals through the window.

In some examples, the window may include a coating disposed on the first surface and/or on a surface parallel to the first surface. In some examples, the coating may be an electrochromic device. In some examples, the coating may be a low emissivity coating or antireflective coating. In some examples, the coating may exclude a region proximate to the radiating elements. In some examples, the region may be less than about 2% of the area of the first surface. In some examples, the region may be formed by removing a portion of the coating from the region. In some examples, the removing may be configured to create a pattern of removed and unremoved material that allows passive modification of electromagnetic energy passing through the window. In some examples, the pattern may be structured to focus, spread, direct, and/or polarize the electromagnetic energy. In some examples, the removing may be configured for facilitating reception of a cellular signal. In some examples, facilitating reception of a cellular signal may include tuning reception properties of a radio receiver, and/or defining the shape, size, and/or location of the region. In some examples, the removing may reduce attenuation by selectively removing material proximate to the radiating elements. In some examples, the coating may be removed from an S1, S2, S3 and/or S4 surface of a double pane integrated glass unit. In some examples, the coating may include electrically conductive, semi-conductive, dielectric and/or insulating materials. In some examples, the material removed may include transparent metal oxides and/or a conductive polymer or gel. In some examples, the removing may include one or more of optical techniques, mechanical techniques, thermal techniques, chemical techniques or exposing the region to a plasma. In some examples, the optical techniques may include laser ablation. In some examples, the chemical techniques may include etching, dissolving, reacting, oxidizing or reducing. In some examples, the removing may be executed after the window is installed using a portable device. In some examples, the portable device may employ focused laser ablation to selectively remove the material. In some examples, the removing may be performed after the window is installed in the building.

In some examples, the antenna arrangement may be attached after the window is installed in the building. In some examples, a retrofit of the building with the antenna arrangement may enable cellular coverage outside and/or inside the building. In some examples, the cellular coverage may include a 5G cellular coverage.

In some examples, the building structure may be a window frame structure.

In some examples, the building structure may be a mullion. In some examples, a mullion cap may be disposed with the mullion, the mullion cap including a mullion cap body and at least one antenna wing. In some examples, the mullion cap may be configured to be fixedly attached to the vertical mullion. In some examples, the mullion cap may be configured to include one or more gripping portions for fixedly attaching the mullion cap to the vertical mullion. In some examples, the one or more gripping portions may include a snap fit mechanism. In some examples, the mullion cap body may be substantially elongate, extending, along an axis parallel to a longitudinal axis of the mullion. In some examples, the mullion cap body may be substantially L-shaped in cross-section in a plane perpendicular to the longitudinal axis of the mullion. In some examples, the mullion cap may support two or more antenna wings. In some examples, a longitudinal length of the at least one antenna wing may be greater than a transverse width of the at least one antenna wing. In some examples, the ratio between the longitudinal length and transverse width of the at least one antenna wing may be greater than 2. In some examples, the ratio between the longitudinal length and transverse width of the at least one antenna wing may be greater than 5. In some examples, a longitudinal length of the at least one antenna wing may be less than a transverse width of the at least one antenna wing. In some examples, a ratio between the longitudinal length and transverse width of the at least one antenna wing may be less than 0.5. In some examples, the ratio between the longitudinal length and transverse width of the at least one antenna wing may be less than 0.2. In some examples, the at least one antenna wing may include a glass substrate with one or more radiating elements formed thereon. In some examples, the at least one antenna wing may be substantially transparent. In some examples, the at least one antenna wing may be formed using a glass configured from a low alkali thin glass or a fusion drawn glass. In some examples, the glass may be configured as a first glass substrate for the at least one antenna wing. In some examples, the antenna wing may include a second glass substrate. In some examples, the first glass substrate and the second glass substrate may be laminated together. In some examples, the radiating elements may be disposed between the first glass substrate and the second glass substrate. In some examples, the radiating elements may be etched on one of first glass substrate and the second glass substrate and/or buried in a lamination adhesive used to mate the first glass substrate and the second glass substrate. In some examples, the radiating elements may be laser etched from one or more transparent coatings on the glass. In some examples, the transparent coatings may include conductive metal oxide coatings. In some examples, the at least one antenna wing may be configured to avoid contrasting with the window glass. In some examples, the at least one antenna wing may be opaque. In some examples, the at least one antenna wing may be configured to include a generally opaque obscuration material, paint, ink or other material substantially transparent to radio frequency (RF) signals. In some examples, the obscuration material may be applied only where the antenna wings footprint resides. In some examples, the obscuration material may be applied along an entire side of the glass substrate or around all four sides of the glass substrate so as to mask the visual impact of the mullion cap and or the at least one antenna wing. In some examples, the mullion cap may include vents extending from a proximal portion of the mullion cap body to a distal portion of the mullion cap body. In some examples, at least some vents may not extend through the entire length of the mullion cap body. In some examples, at the proximal portion of the mullion cap body, the vents may be configured to provide for air intake to cool the mullion cap and/or communications electronics housed therein and include an exit at the distal portion of the mullion cap body to facilitate air exhaust. In some examples, at least some vents may be configured to include force air cooling provisions.

In some examples, the antenna arrangement may further comprise a radio in electrical communication with the radiating elements. In some examples, the antenna arrangement may be configured transceive radiofrequency signals in two polarization states. In some examples, a single conductive radiating element may provide the two orthogonal polarization states and the antenna arrangement includes two ports and two transceivers to provide signals with two different polarization states. In some examples, the antenna arrangement may have a substantially flat surface registered with the region of the window where the coating was removed. In some examples, the substantially flat surface may be substantially parallel to the first surface.

In some examples, the antenna arrangement may have a multiple-input multiple-output (MIMO) configuration.

According to some implementations, a method of transceiving radio frequency (RF) signals includes (a) disposing a window in a building, the window having a first surface facing an interior of the building; and (b) attaching an antenna arrangement to a building structure adjacent the first surface; wherein the antenna arrangement comprises one or more radiating elements configured to transceive the RF signals through the window.

In some examples, the window may include a coating disposed on the first surface and/or on a surface parallel to the first surface. In some examples, the coating may be an electrochromic device. In some examples, the coating may be a low emissivity coating. In some examples, the coating may exclude a region proximate to the radiating elements.

In some examples, the antenna may be configured to provide cellular coverage outside the building. In some examples, the cellular coverage may include a 5G cellular coverage.

In some examples, the structure may be a window frame structure.

In some examples, the structure may be a mullion.

In some examples, the antenna may further comprise a radio connected to the radiating elements.

In some examples, the antenna may have a multiple-input multiple-output (MIMO) configuration.

According to some implementations, a system includes a plurality of window antennas, each configured to transceive wireless radio frequency (RF) signals through a respective window to or from particular locations, using spatial filtering and/or other beamforming techniques. Each respective window has a first surface facing, when installed in the building, an interior of the building, each window antenna is configured to attach to a structure adjacent the first surface and the window antenna comprises one or more radiating elements configured to transceive RF signals through the window.

In some examples, the beamforming techniques may employ active interference, null forming, and/or other techniques.

In some examples, the beamforming techniques may form complex signal peaks and null regions tailored to locations of user equipment. In some examples, the signal peaks may be formed at locations of devices that need to communicate over a channel having the signal peak and/or null regions are formed at locations where other devices are located that are not communicating over the channel. In some examples, signal adjustments required to provide peaks and null regions may be made in the digital and/or the analog domain. In some examples, adjustments in the analog domain may be made to the phase, amplitude, and/or other characteristic(s) of the RF signals transmitted from individual antennas.

According to some embodiments, a window antenna system includes (a) a window; (b) an electrically conductive antenna radiating element disposed proximate to the window; (c) a transceiver; and (d) compensation circuitry electrically coupled with the transceiver that adjusts for interactions between the window and the conductive antenna radiating element.

In some examples, the radiating element may include a patch antenna element.

In some examples, the compensation circuitry may facilitate transmission through the window.

In some examples, the compensation circuitry may be incorporated into the transceiver.

In some examples, the compensation circuitry may be separate from the transceiver.

In some examples, the compensation circuitry may be flexibly or tunably configurable for deployment on windows having a variety of physical parameters. In some examples, the physical parameters may include a separation distance between the antenna radiating element and at least one reflective surface of the window. In some examples, the physical parameters may include physical properties of the glass coating that influence a magnitude of a reflected signal.

In some examples, the compensation circuitry may be configured to tune the compensating signal it applies to the conductive antenna element to account for differences in time-of-flight of reflected signals for different distances between the conductive antenna element and the at least one reflective surface.

In some examples, the window may include an indicator of the physical parameters, the indicator configured to be read by the compensating circuitry or associated processing module. In some examples, the indicator may include one or more of a barcode, a QR code, or an RFID.

DETAILED DESCRIPTION

In some embodiments, an antenna system may be configured to hold an antenna against a window or in close proximity to a window, e.g., within one centimeter. The antenna may be on a glass substrate which is substantially flat, or curved. Close proximity of the antenna and window may be combined with a modification the window, that reduces attenuation of electromagnetic energy passing through the window, facilitates an antenna's ability to provide wireless communications coverage outside the window, such as in a region outside a building housing the window. As explained, the antenna system may have various configurations and may be installed in the building in various locations. It may also be attached to building structures in various ways. Some of these are described below. In certain embodiments, the antenna system is provided as a mullion cap.

Figure 1:
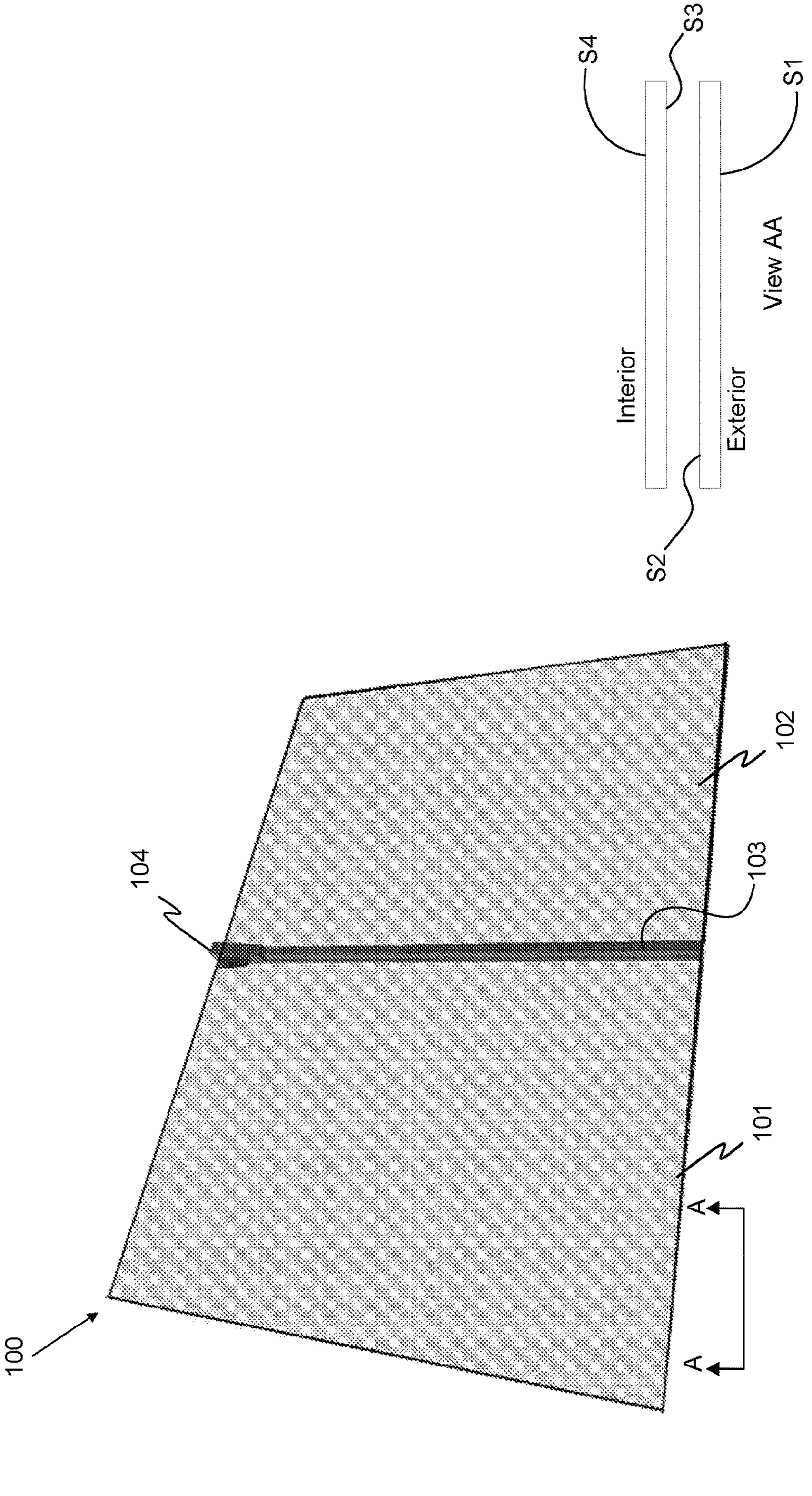
FIG. 1 shows a portion of a building's window structure including a first lite and a second lite joined along adjacent edges by a mullion including a mullion cap, according to an embodiment.

FIG. 1 shows a portion 100 of a building's window structure including a first window lite 101 and a second window lite 102. Lites 101 and 102 are adjacent each other, e.g. installed in a framing system, held in place along adjacent edges by a vertical mullion 103. The vertical mullion 103 provides structural support for the first and second lites 101 and 102. In a typical framing system, there are series of such vertical and horizontal mullions; antenna systems described herein may be installed on vertical or horizontal mullions. In FIG. 1, only a portion of a vertical mullion is depicted, for simplicity. In some embodiments, the vertical mullion 103 forms part of a frame which surrounds the first and second lites 101 and 102. For example, such a frame may be made up of multiple such vertical mullions and multiple horizontal mullions. In some embodiments, the vertical mullion 103 also functions as a conduit or channel in which power supply and/or data communications wiring or cabling may be provided, e.g. for the antenna systems described herein and/or electrochromic windows and/or transparent displays as and/or for a building network as described in U.S. Pat. Pub. 2020-0150508, entitled "BUILDING NETWORK", filed Oct. 25, 2019, assigned to the assignee of the present invention and hereby incorporated by reference in its entirety into the present application.

In the embodiment shown in FIG. 1, the first lite 101 and the second lite 102 may be perceived as single panes of glass. However, one or both of the first and second lites may be the inboard lite of insulated glass units (IGUs). Referring to View A-A of FIG. 1, an IGU may include a first pane having a first (outboard) surface S1 and a second (inboard) surface S2. In some implementations, the first surface S1 faces an exterior environment, such as an outdoors or outside environment. The IGU also includes a second pane having an outboard surface S3 and an inboard surface S4. In some implementations, the second surface S4 of the second pane faces an interior environment, such as an inside environment of a home, building or vehicle, or a room or compartment within a home, building or vehicle.

They may be part of a laminate that is a stand-alone lite or a lite (e.g. the inboard lite) of an IGU. In some embodiments, the first lite 101 and the second lite 102 (or one or more panes of the corresponding IGUs) have one or more attenuating coatings thereon, such as functional coatings. For example, in some embodiments, the glass is coated with a low-emissivity material, such that the glass can be referred to as low-emissivity (i.e. low-e) glass. In some embodiments, the glass is coated with a functional device coating, such as an electrochromic device coating, in addition to, or as an alternative to, the low-emissivity material. In IGUs, such coatings may be on one or more surfaces of the IGU glass lites.

As shown in FIG. 1, a mullion cap 104 is mounted on the vertical mullion 103, in the interior of the building. The surface of glass lites 101 and 102, facing the interior of the building, would be surface 4 of a double pane IGU, using window industry recognized nomenclature described hereinabove. Example features of exemplary mullion caps 104 are shown in more detail in FIGS. 2, 3, 4 and 5 in which it may be observed that mullion cap 104 includes a mullion cap body 105 and antenna wings 106 and 107. The mullion cap body 105 may be substantially elongate, extending, along an axis parallel to the longitudinal axis of the vertical mullion 103. The mullion cap may have only one antenna wing, e.g. when only one is needed, and/or a mullion on the edge of a window that abuts a wall may only be able to accommodate an antenna wing on one side of the mullion.

Figure 5:
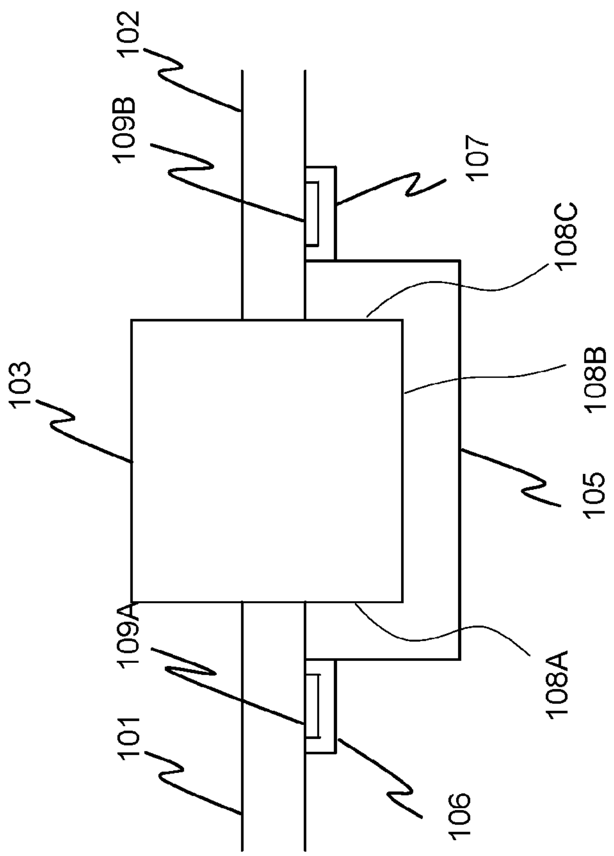
FIG. 5 shows the mullion cap, the mullion and a portion of the first and second lites schematically in cross-section.

FIG. 5 shows the mullion cap 104, the vertical mullion 103 and a portion of the first and second lites 101 and 102 schematically in cross-section in a horizontal plane (i.e. a plane perpendicular to the longitudinal axis of the vertical mullion 103) through a region of the mullion cap 104 including the antenna wings 106 and 107. In FIG. 5, it can be seen that the mullion cap body 105 is substantially U-shaped in cross-section. That is to say, the mullion cap body 105 has three principal mullion cap body portions 108A, 108B and 108C, each arranged to lie flush against corresponding portions of three faces of the vertical mullion 103.

Figure 2:
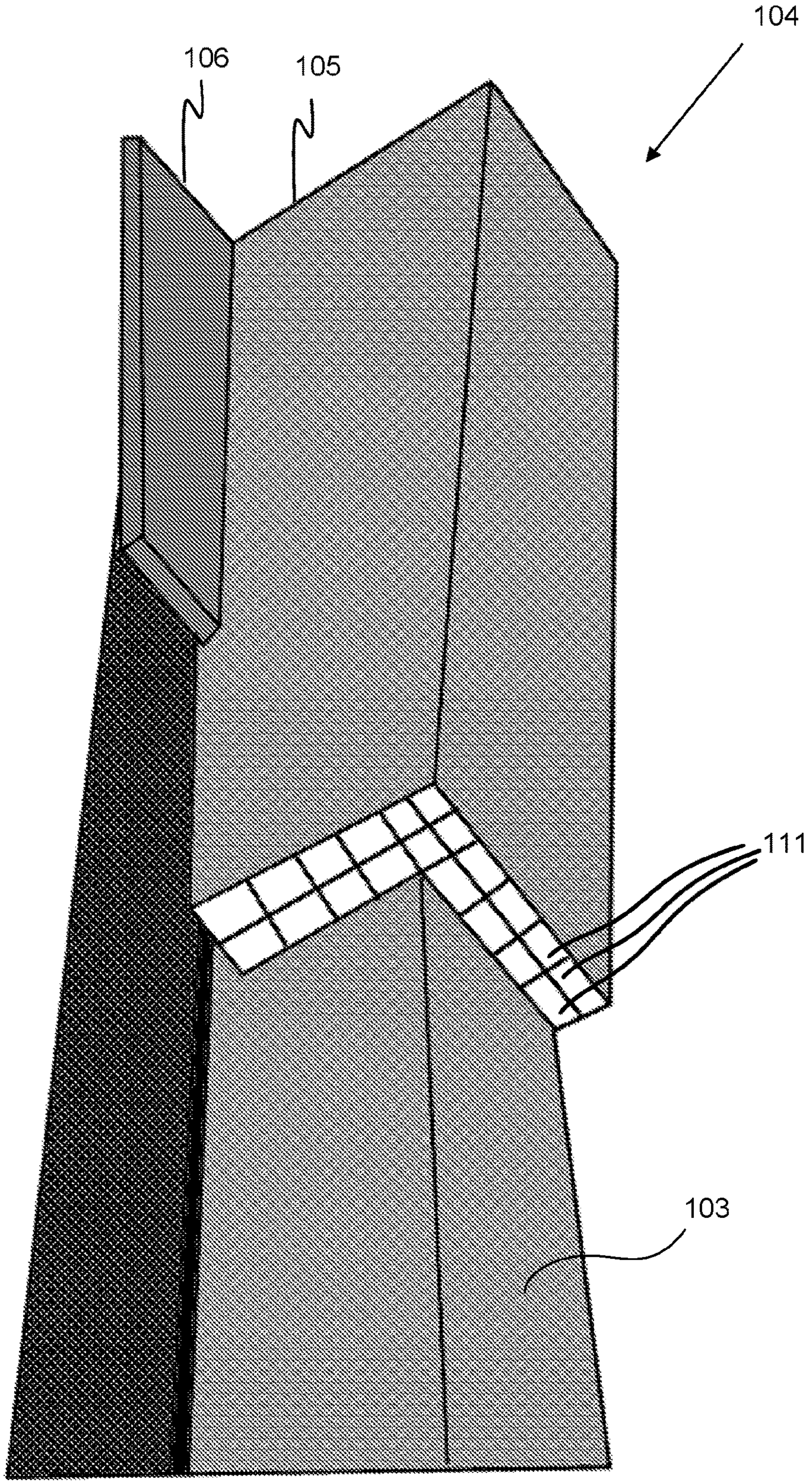
FIGS. 2-4 illustrate example features of the mullion cap, according to various embodiments.
Figure 3:
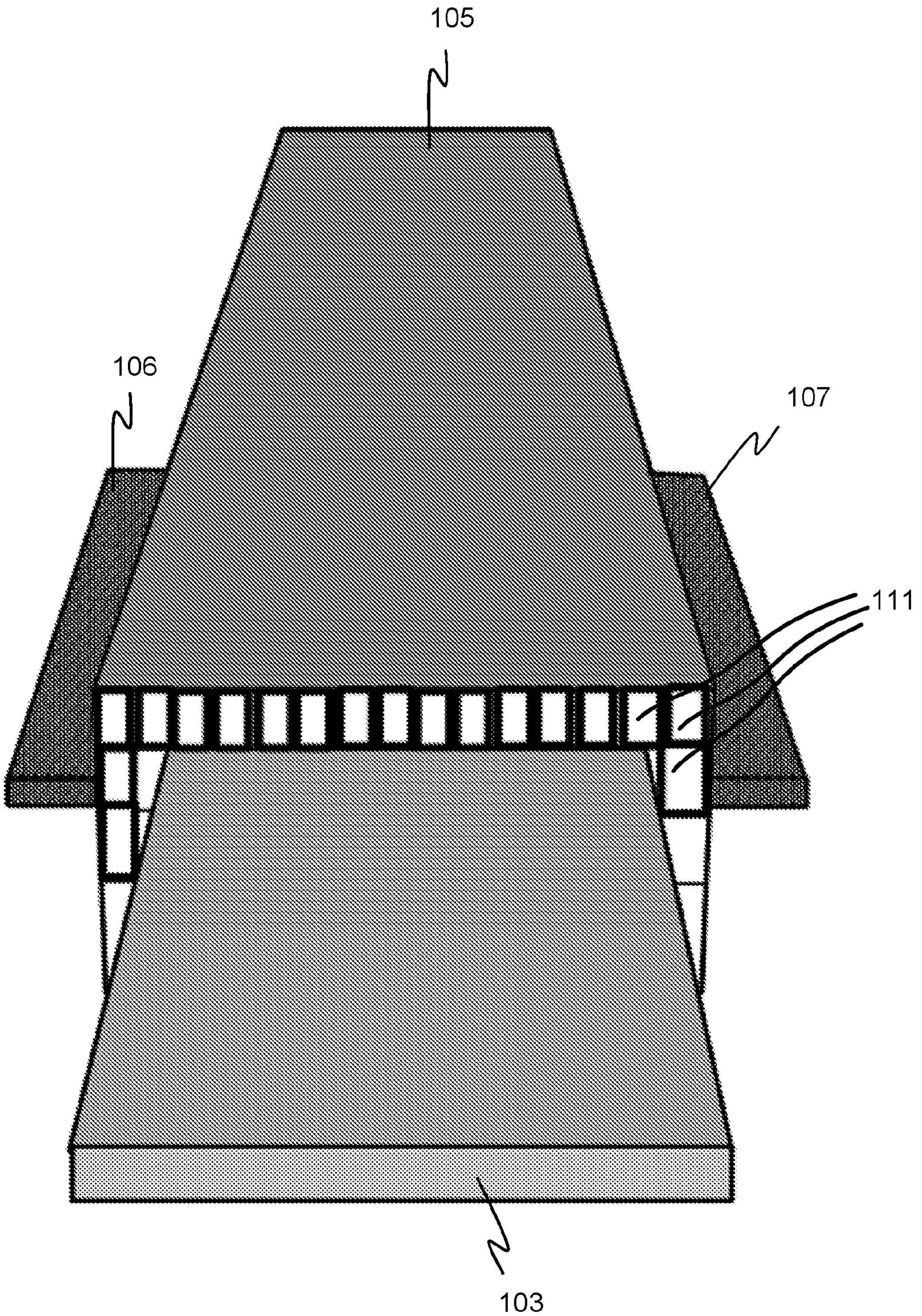
Figure 4:
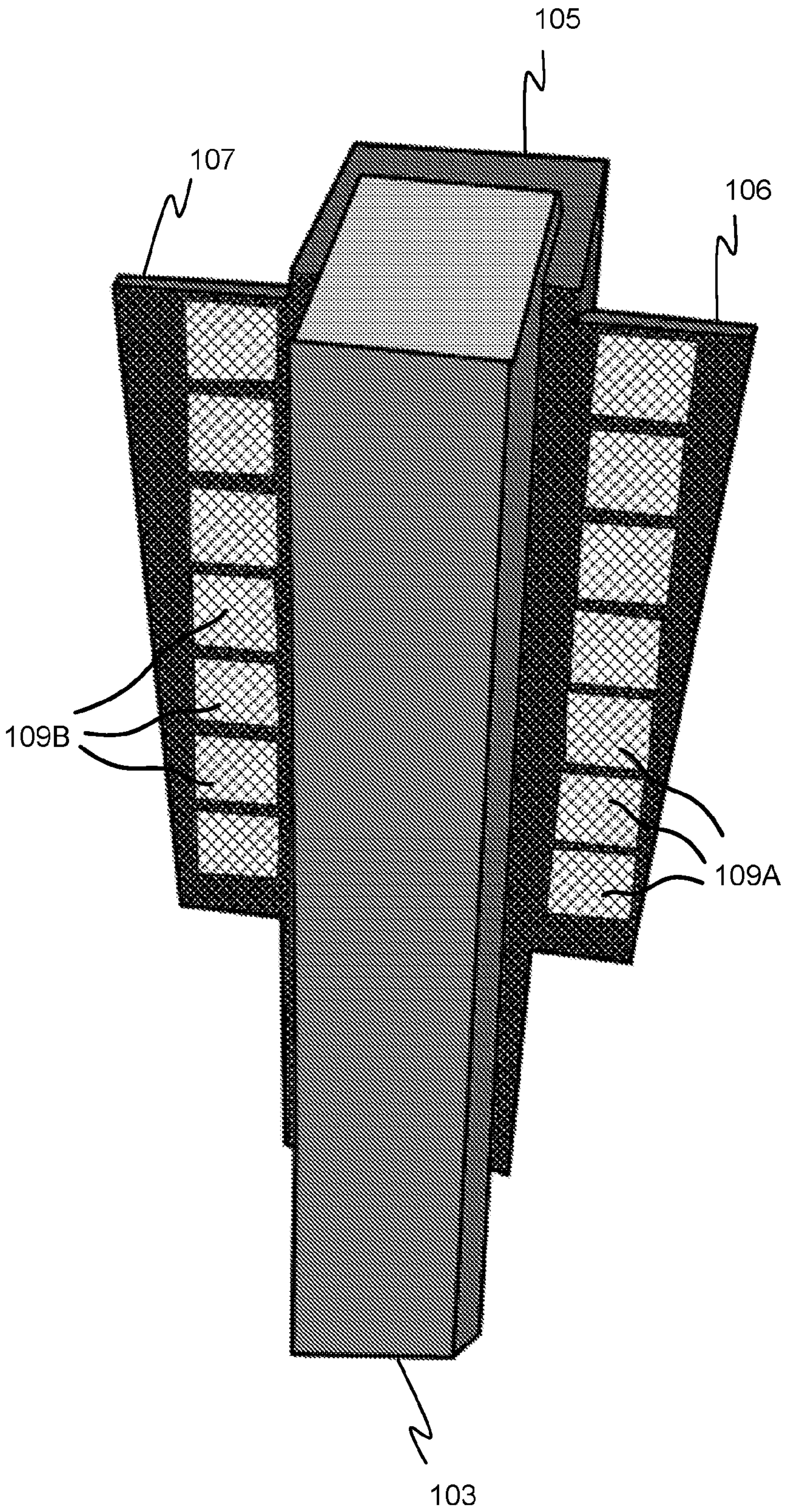

In the embodiment shown in FIGS. 1, 2, 3, 4 and 5, the antenna wings 106 and 107 extend away from the mullion cap body 105 on opposing sides. The antenna wings 106 and 107 in these examples are substantially planar and rectangular in shape (when viewed perpendicular to the vertical plane of the lites 101 and 102). In the illustrated example, antenna wings 106 and 107 are arranged to lie against adjoining surfaces of the respective lites 101 and 102. As can be seen in FIG. 4, a plurality of antenna elements 109A and 109B may be disposed on lite-facing surfaces of, respectively the antenna wings 106 and 107. The antenna wings 106 and 107 may therefore function as respective supports for the antenna elements 109A and 109B. The antenna elements 109A and 109B of the antenna wings 106 and 107, together with communications components (such as transceivers or radios) housed in the mullion cap body 105 (which functions as a protective casing for the communications components), may constitute the antenna system. In alternative embodiments, the antenna wings have a glass substrate with one or more antennas formed thereon; the antenna wing may be substantially transparent. In one embodiment the antennas are laser etched from one or more transparent coatings on the glass, e.g. transparent conductive metal oxide coatings. In such embodiments, it is desirable to have the antenna wings have as little contrast as possible to the window glass, so as not to be noticeable to building occupants or those outside the building looking in the window.

As can be seen in FIGS. 2 and 3, the mullion cap body 105 may include a plurality of vents 111 extending in a direction parallel to the longitudinal axis of the mullion 103. The illustrated plurality of vents may extend from a proximal portion of the mullion cap body 105 (foreground of FIGS. 2 and 3) to a distal portion (background of FIG. 2 or 3, respectively). Alternatively or in addition, at least some vents 111 may not extend through the entire length of the mullion cap body 105. In the embodiment depicted in FIGS. 2 and 3, the vents 111 at the proximal portion of the mullion cap body 105 may be configured to provide for air intake to cool the mullion cap (for example, to cool communications components, such as transceivers or radios housed therein) and include an exit at the distal portion of the mullion cap body 105 (vents not shown) to facilitate air exhaust. In some embodiments, the mullion cap is cooled by passive convective air flow, with air entering a vent 111 at a lower portion of the mullion cap body 105 and rising naturally as the air absorbs heat from the communications and escaping through the vent at an upper portion of the mullion cap body 105, thereby causing cooler air to be drawn into the mullion cap through the lowermost vents. Nevertheless, the positioning of vents may be different in other embodiments. For example, in some embodiments, air intake and air exhaust may take place at the same end of the mullion cap body. In some embodiments, the mullion cap may not be exclusively passive, i.e. an active device such as a fan may be configured to drive movement of air through the mullion cap body 105.

As can be seen in FIGS. 1 to 5, mullion cap 104 is attached to the vertical mullion 103. Different methods of attachment are possible. In some embodiments, the mullion cap 104 grips the vertical mullion 103. For example, in some embodiments, the mullion cap 104 is mounted to the vertical mullion 103 by an interference fit. Accordingly, in some embodiments, the mullion cap 104 is configured (i.e. dimensioned) for an interference fit with a particular design of vertical mullion 103. In some embodiments, the mullion cap 104 includes one or more gripping portions for gripping the vertical mullion 103. In some embodiments, the one or more gripping portions are adjustable to enable gripping of the vertical mullion 103. In some embodiments, the one or more gripping portions include a biasing mechanism (such as a spring mechanism) to enable gripping of the vertical mullion 103. In some embodiments, the one or more gripping portions include flexible, deformable and/or resilient elements which enable gripping of the vertical mullion 103. A gripping portion may include a snap fit mechanism, e.g. the U-shape of a mullion cap body may fit snugly over a mullion, and may include specific protrusions that fit into grooves of the mullion, or vice versa In some embodiments, the mullion cap 104 is fixedly attached to the vertical mullion 103. For example, the mullion cap 104 may be bolted or screwed or riveted to the vertical mullion 103. In some embodiments, the mullion cap is adhesively attached to the mullion. Such attachments can be made without puncturing the hermetic seal that a curtain wall makes for a building, i.e. only small holes in the interior-disposed mullion are made to accommodate the bolt, screw or rivet. In other embodiments, the mullion cap 104 is welded to the vertical mullion 103. In some embodiments, the mullion is made of PVC or other polymeric material, for example that is extruded. Ultrasonic welding may be used to attach the mullion cap to such a PVC or polymeric material mullion.

The attachment means for the mullion cap may include positioning elements, e.g. to align or otherwise configure the antenna wings appropriately for their intended transmission and reception characteristics. Positioning elements can be, e.g., sliding, rotating or other adjustable stages or elements that can be positioned and then locked into place, e.g. by a set screw or other clamping mechanism. This may allow precise positioning of the antenna wings and also repositioning and/or replacement of the antenna wings e.g. if the transmission/reception characteristics change. That is, the antenna wings may be moveable and removable and the antenna portions of the wings may be moveable and removable. In certain embodiments the antenna wings may be configured so as not to be substantially parallel to the window lite.

In some embodiments, the mullion cap is integrated (i.e., integrally formed) with the mullion, for example the mullion cap and the mullion are configured as a unitary component. In some embodiments, the mullion cap and the mullion are distinct components, but the mullion cap and the mullion are installed in the building together, for example where the mullion cap is attached to the mullion before the mullion is installed in the building. Alternatively, the mullion cap may be attached to the mullion during construction of the building, after installation of the mullion itself.

In the embodiment shown in FIGS. 1 to 5, the antenna wings 106 and 107 are substantially elongate in the vertical direction (i.e. parallel to the longitudinal axis of the vertical mullion 103). That is to say, a vertical length of each of the antenna wings 106 and 107 is greater than the corresponding horizontal width. In some embodiments, the ratio between the vertical length and horizontal width of each antenna wing is greater than 1, for example, greater than 2, or greater than 3, or greater than 4, or greater than 5.

In the embodiment shown in FIGS. 1 to 4, the antenna wings 106 and 107 do not extend along the entirety of the longitudinal length of the mullion cap body 105, although the said antenna wings do extend along a substantial proportion of the longitudinal length of the mullion cap body 105. Instead, in the embodiment shown in FIGS. 1 to 4, the antenna wings extend along approximately two thirds of the longitudinal length of the mullion cap body 105. Additionally, in the illustrated examples, the antenna wings are arranged such that they extend longitudinally to an end of the mullion cap body 105. Accordingly, there is a region of the mullion cap body 105 to which the antenna wings 106 and 107 do not extend.

Figure 6:
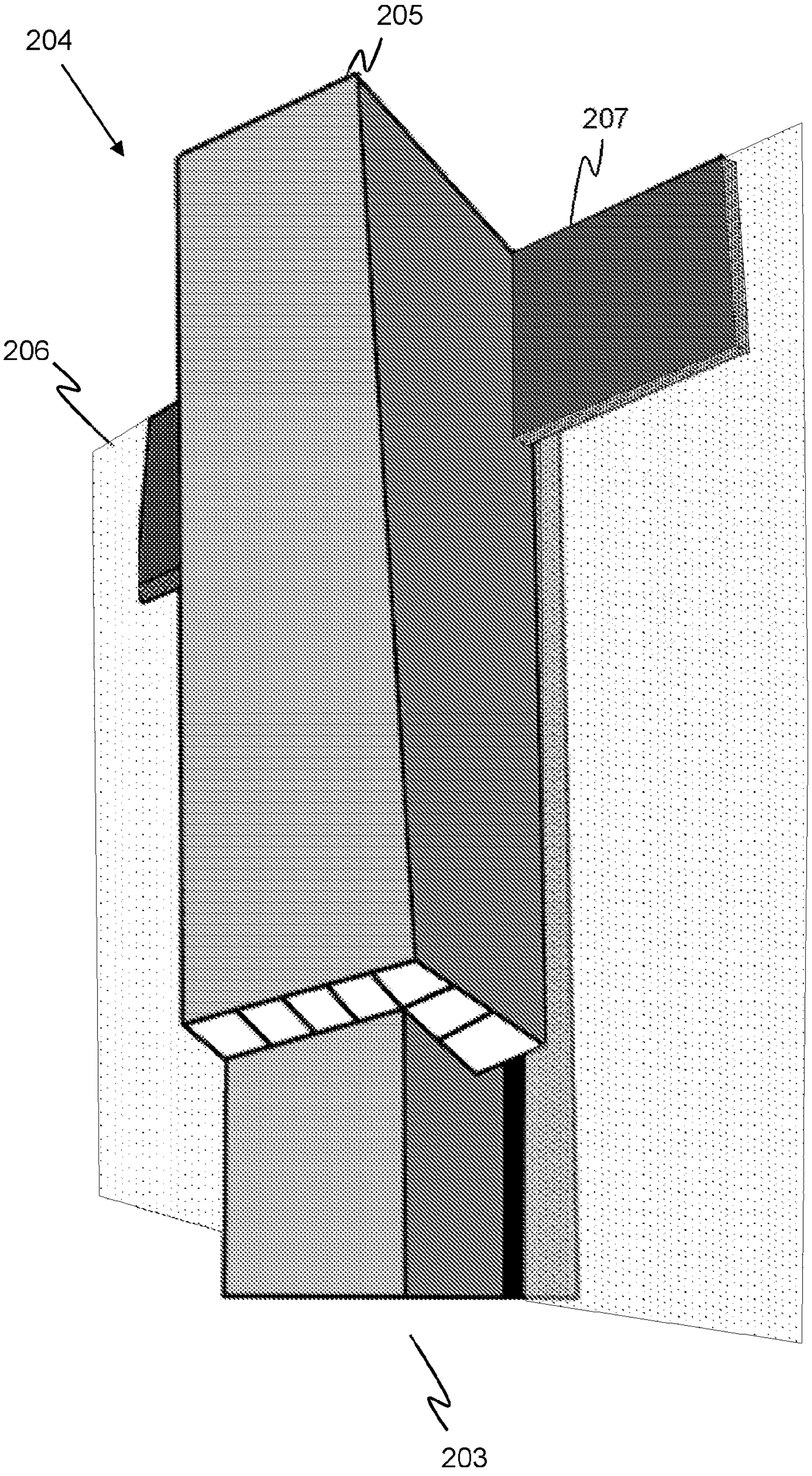
FIGS. 6 and 7 show a mullion cap according to another embodiment.
Figure 7:
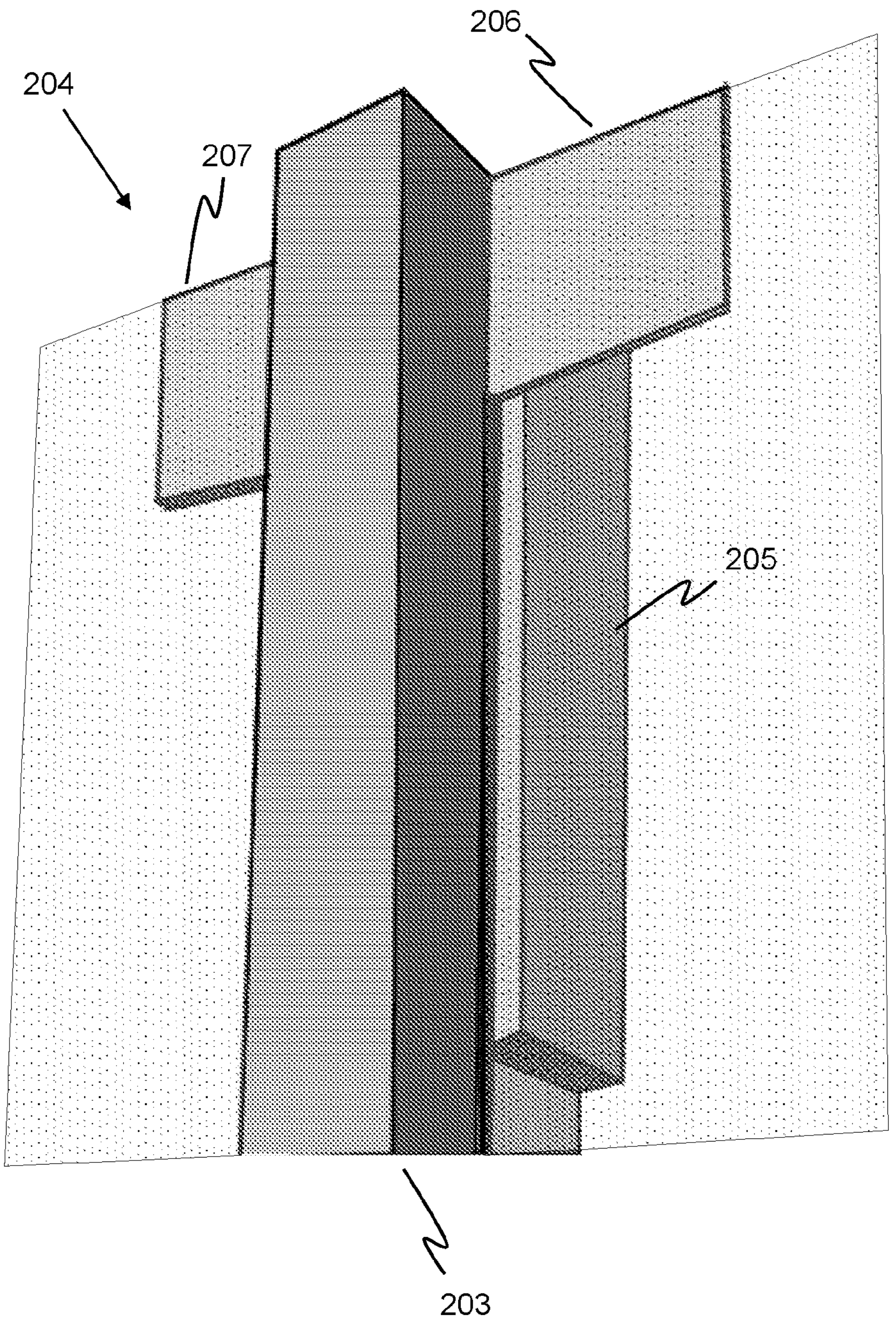

In other embodiments, however, the antenna wings take different shapes and/or arrangements. For example, FIGS. 6 and 7 illustrate a mullion cap 204 including a mullion cap body 205, which has substantially the same shape as mullion cap body 105, and antenna wings 206 and 207, which are substantially elongate in a direction transverse to the longitudinal axis of the vertical mullion 203. FIG. 6 depicts mullion cap 204 from a perspective interior to a building and FIG. 7 depicts mullion cap 203 from the perspective outside of a building. In the illustrated example, a longitudinal length of each of the antenna wings 206 and 207 is less than the corresponding transverse length. In some embodiments, the ratio between the longitudinal and transverse lengths of each antenna wing is less than 1, for example, less than 0.5, or less than 0.3, or less than 0.25, or less than 0.2.

In the embodiment showing in FIGS. 6 and 7, the antenna wings 206 and 207 do not extend along the entirety of the longitudinal length of the mullion cap body 205. Rather, the antenna wings 206 and 207 extend vertically along approximately one quarter of the longitudinal length of the mullion cap body 205. The antenna wings 206 and 207 are arranged such that they extend longitudinally to an end of the mullion cap body 205. Accordingly, there is a region of the mullion cap body 205 which is not framed by antenna wings.

Figure 8:
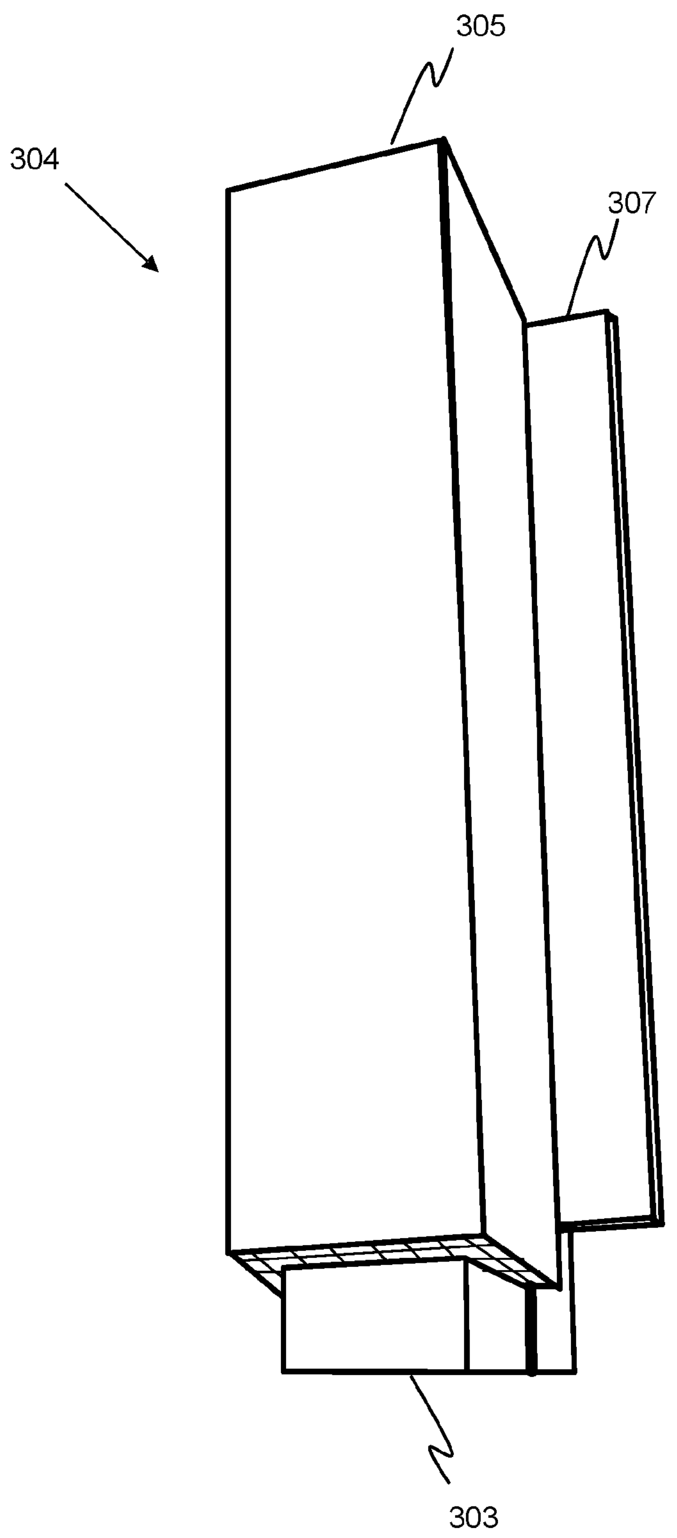
FIGS. 8 and 9 show a mullion cap according to a yet further embodiment.
Figure 9:
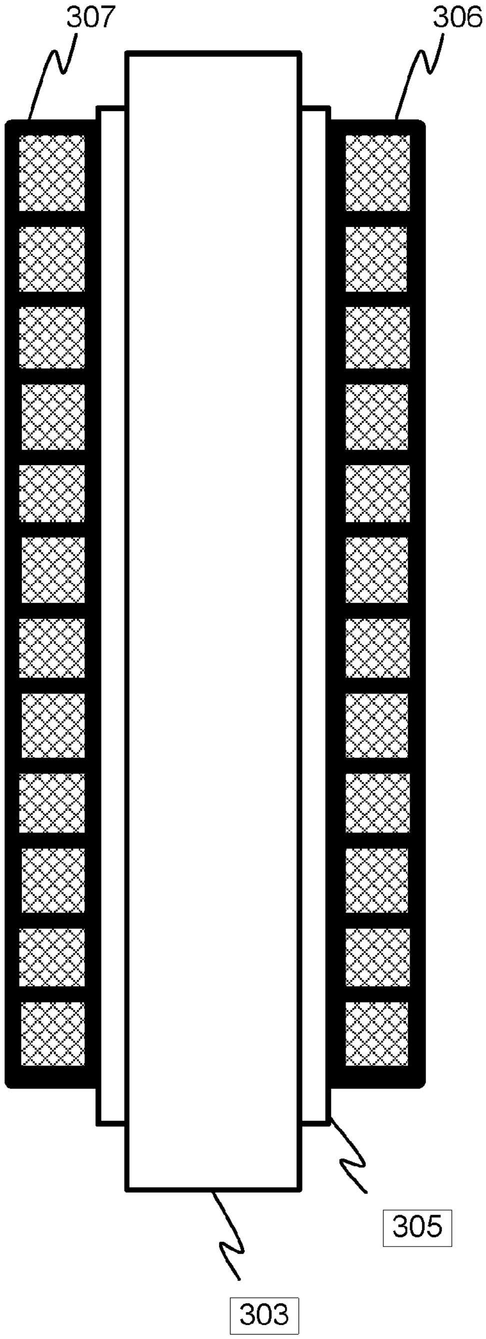

FIGS. 8 and 9 illustrate a further exemplary mullion cap 304 which includes a mullion cap body 305, which has substantially the same shape as mullion cap body 105, and antenna wings 306 and 307, which are substantially elongate in the longitudinal direction of mullion 303. In the illustrated example, the longitudinal length of each of the antenna wings 306 and 307 is greater than the corresponding horizontal width. For example, in the embodiment shown in FIGS. 8 and 9, the ratio between the vertical length and horizontal width of each antenna wing is approximately ten. Moreover, the antenna wings 306 and 307 of FIGS. 8 and 9 extend along substantially the entirety of the longitudinal length of the mullion cap body 305, save for a small region of the mullion cap body 305 near the lower end which is not framed by antenna wings. The antenna wings 306 and 307 are arranged such that they extend longitudinally to the upper end of the mullion cap body 305.

In the embodiments of FIGS. 1 to 9, the antenna wings 106, 107, 206, 207, 306 and 307 may be opaque because, for example, they include at least opaque materials such as opaque metals and/or polymers. An obscuration material, paint, ink or other material substantially transparent to radio frequency (RF) signals, but generally opaque to visible light may be used to obscure the antenna wings. The obscuration material may be applied only where the antenna wings footprint resides or along an entire side of the glass or, for example, around all four sides of the glass so as to mask the visual impact of the mullion cap and particularly the antenna wings.

In some embodiments, however, at least portions of antenna wings may be translucent or transparent, for example, because they include translucent or transparent materials, such as glass or transparent polymers.

Figure 10:
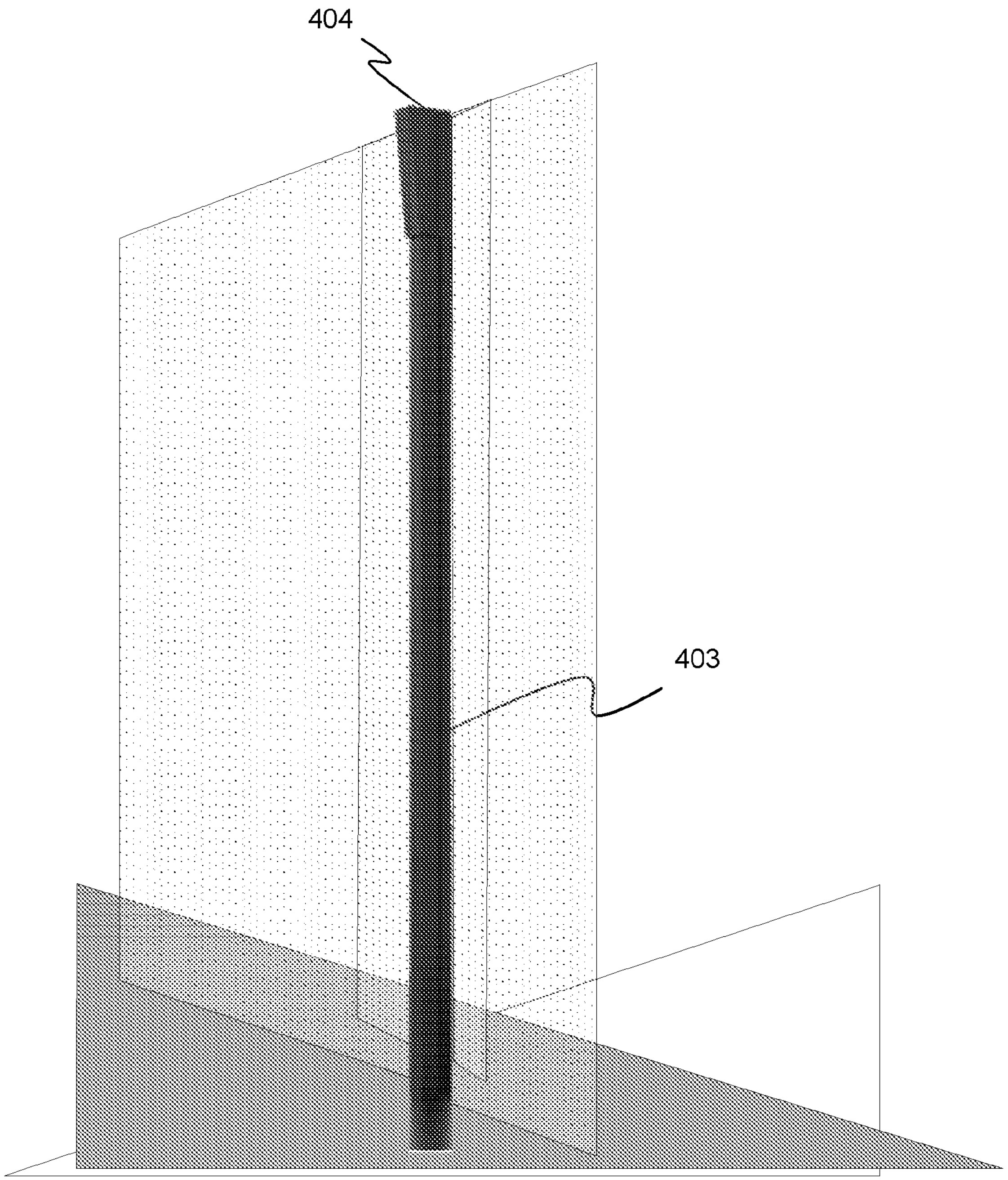
FIGS. 10 and 11 show a mullion cap according to a yet further embodiment.
Figure 11:
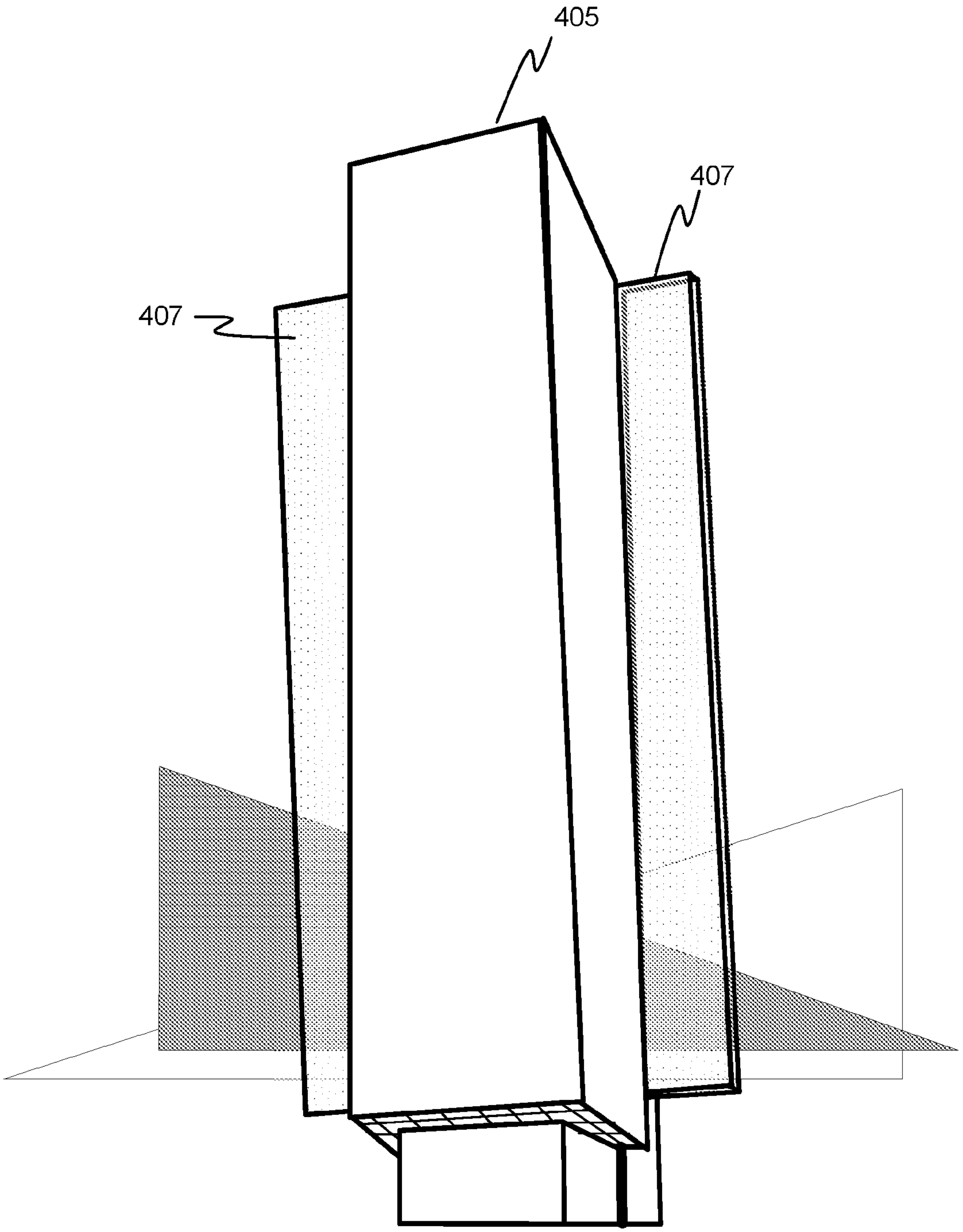

For example, FIGS. 10 and 11 illustrate a mullion cap 404 including a mullion cap body 405, which has substantially the same shape as mullion cap body 305, and antenna wings 406 and 407, which have substantially the same shape as antenna wings 306 and 307. Antenna wings 406 and 407, however, differ from antenna wings 306 and 307 in that antenna wings 406 and 407 are include transparent materials, such as glass, so that the antenna wings 406 and 407 are substantially transparent. As a result, the antenna wings may be substantially less noticeable than opaque antenna wings. Transparent antenna wings may be functionally invisible when the mullion cap is mounted to a mullion, such that a casual observer would not ordinarily notice the presence of the transparent antenna wings unless the observer's focus is drawn directly to the antenna wings.

Transparent antenna wings may be formed using e.g. low alkali thin glass, such Eagle XG™ or similar fusion drawn glass, commercially available from Corning, Inc. of Corning, NY, U.S.A. Such glass may be used as a substrate for the antenna wing, with one or more substantially transparent antennas formed thereon. The antenna wing may include an additional glass substrate, where the two substrates are laminated to each other. In such embodiments, the antennas in the wing may be between the two glass substrates, e.g. etched on one of the substrates and/or buried in a lamination adhesive used to mate the two substrates.

Figure 12:
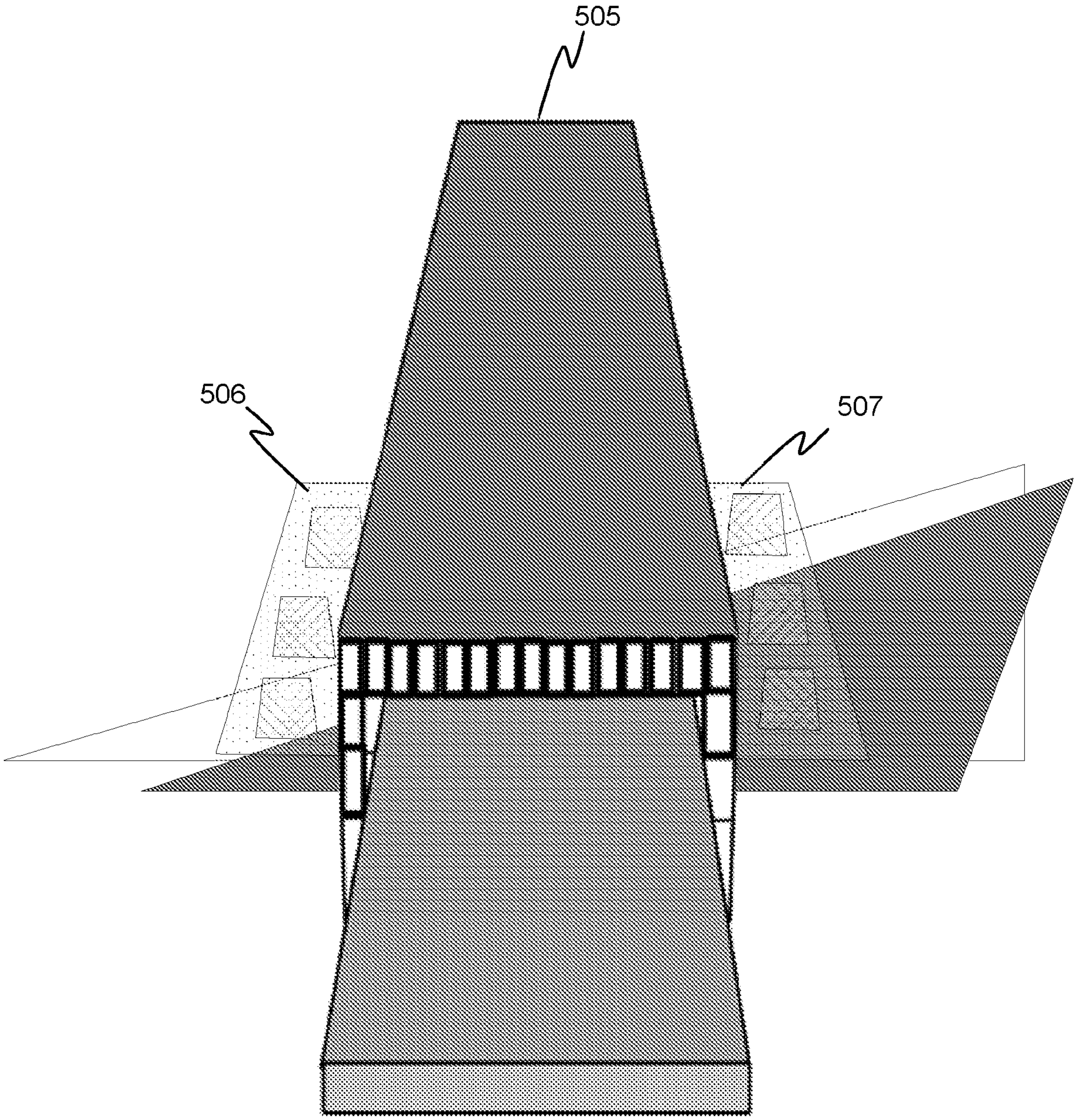
FIG. 12 shows a mullion cap according to another embodiment.

FIG. 12 illustrates a further alternative mullion cap 504 including a mullion cap body 505, which has substantially the same shape as mullion cap body 405, and antenna wings 506 and 507, which have substantially the same shape as antenna wings 406 and 407. Antenna wings 506 and 507 are substantially transparent because they are made of transparent materials, such as glass. Antenna wings 506 and 507 are again substantially less noticeable than opaque antenna wings. The antenna wings 506 and 507, however, may be moderately more visible than antenna wings 406 and 407 due to a discernable antenna pattern etched onto the antenna wings 506 and 507.

Figure 13A:
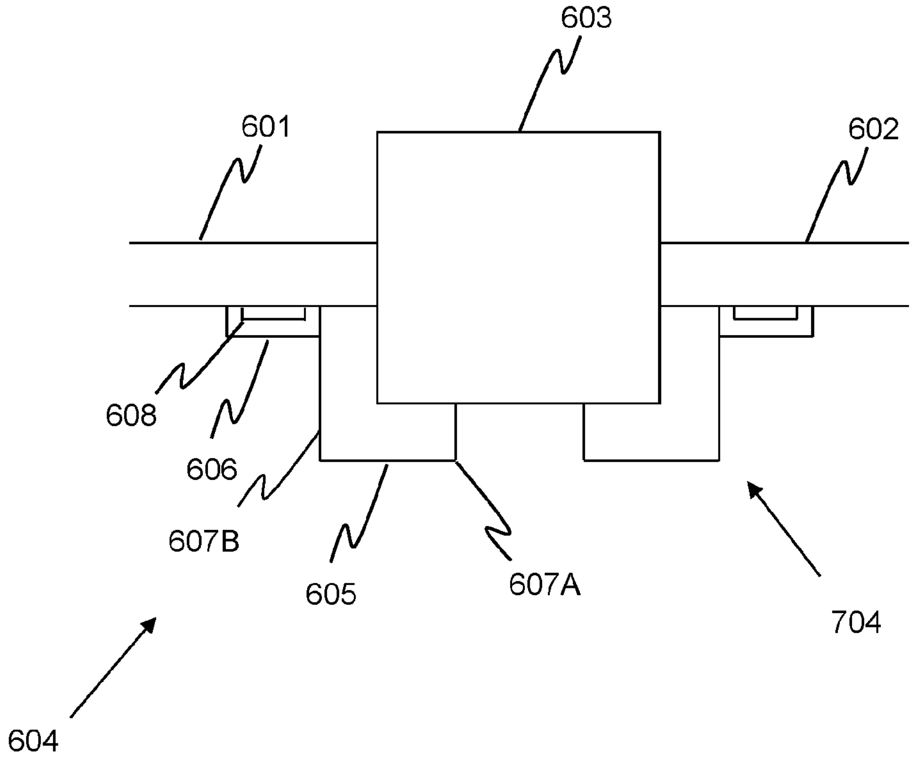
FIGS. 13A and 13B show cross-sectional shapes of a mullion cap according to further embodiments.

In some embodiments, mullion caps take different shapes from those illustrated in FIGS. 1 to 12. For example, FIG. 13A illustrates the cross-sectional shape of a mullion cap 604 mounted on a vertical mullion 603. The mullion cap 604 includes a mullion cap body 605 and a single antenna wing 606. The mullion cap body 605 is substantially L-shaped in cross-section in a horizontal plane (i.e. perpendicular to the longitudinal axis of the mullion 603). More specifically, in the illustrated example, the mullion cap body 605 has two principal mullion cap body portions 607A and 607B, configured adjacent to corresponding portions of two faces of the vertical mullion 603, such that the mullion cap body 605 fits around an edge of the vertical mullion 603 (corresponding to a vertex of the vertical mullion 603 in cross-section in FIG. 13). The antenna wing 606 extends away from the mullion cap body 605 on one side, flush against the surface of the respective lite 601. As can be seen in FIG. 13A, a plurality of antenna elements 608 are provided on the lite-facing surface of the antenna wing 606. A second mullion cap 704, which may be an approximate mirror-image of mullion cap 604, may be mounted on the opposing side of the vertical mullion 603. L-shaped mullion caps may be used alone, e.g. at a mullion at the edge of a wall, where there is no adjoining window on the other side or the other side of the mullion is not exposed.

Figure 13B:
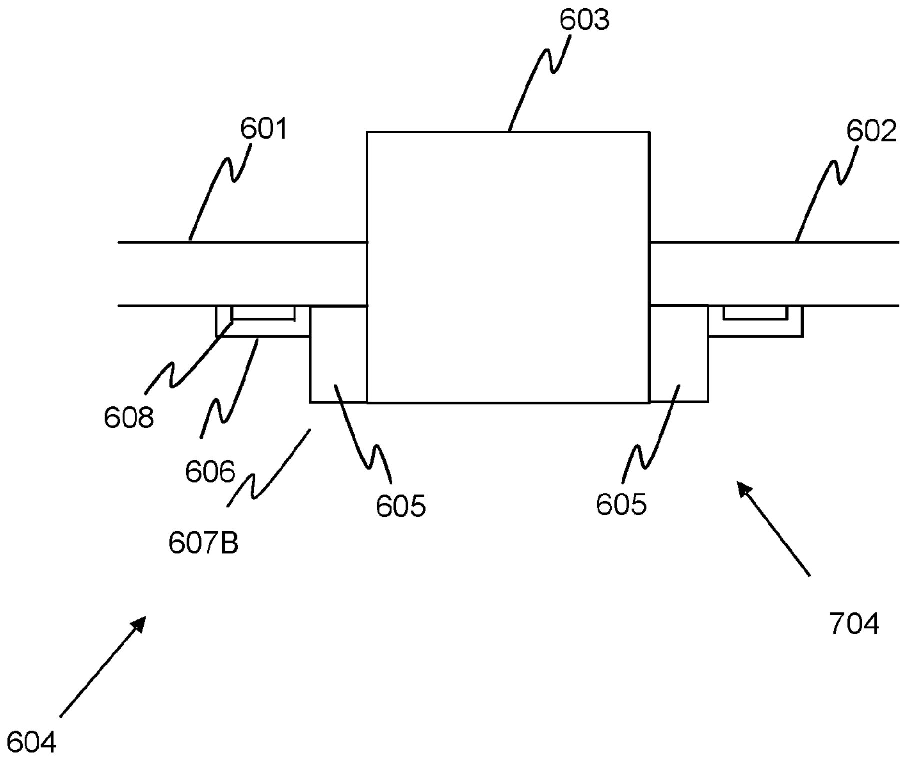

As a further example, FIG. 13B illustrates a cross-sectional shape of a rectangular mullion cap 604 mounted on a vertical mullion 603. The mullion cap 604 includes a mullion cap body 605 and a single antenna wing 606. The mullion cap body 605 is substantially rectangular in cross-section in a horizontal plane (i.e. perpendicular to the longitudinal axis of the mullion 603). More specifically, in the illustrated example, the mullion cap body 605 has a first surface adjacent to a corresponding portion of a face of the vertical mullion 603 that is orthogonal to the lite 601, and a second surface adjacent to the light 601. The antenna wing 606 extends away from the mullion cap body 605 on one side, flush against the surface of the respective lite 601. A plurality of antenna elements 608 may be provided on the lite-facing surface of the antenna wing 606. A second mullion cap 704, which may be an approximate mirror-image of mullion cap 604, may be mounted on the opposing side of the vertical mullion 603.

Figure 14:
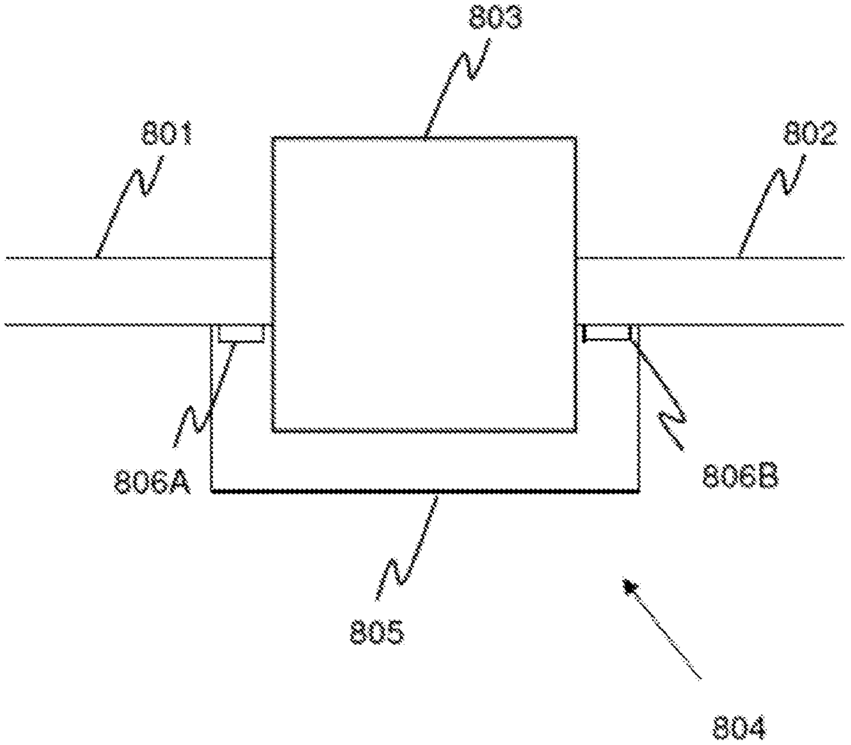
FIG. 14 shows an embodiment in which a mullion cap, mounted to a mullion, includes a mullion cap body including integrated antennas.

In some embodiments, mullion caps do not include antenna wings. In some embodiments, antennas are instead attached to or integrated into the mullion cap body. For example, FIG. 14 shows an embodiment in which a mullion cap 804, mounted to a mullion 803, includes a mullion cap body 805 including integrated antennas 806A and 806B. The antennas 806A and 806B are located on faces of the mullion cap body 805 which are adjacent, or contact, the lites 801 and 802 of the window when the mullion cap 804 is mounted on the mullion 803. The antennas are therefore hidden from view. view from the perspective of a building occupant. Antennas 806 may be visible to those outside the building, or, an obscuration material, transparent to RF frequencies but translucent or opaque, may obscure antennas 806. In other embodiments, antennas 806 are colored to match the mullion cap so that no distinct antenna structures are discernable against the portion of the mullion cap visible to those outside the building.

It is contemplated that antennas may be attached to or integrated with any portions or faces of the mullion cap (e.g., of the mullion cap body), and in particular portions or faces which are adjacent to, face or contact lites when the mullion cap is mounted on a mullion. In some embodiments, mullion caps include both antennas attached to or integrated with antenna wings and antennas attached to or integrated with the mullion cap body. Yet further different mullion cap shapes are possible. For example, the cross-sectional shape and dimensions of the mullion cap body can be configured or selected for mounting to a particular shape and/or size of mullion. For example, in some embodiments, one or more surfaces of the mullion cap are curved to accommodate curvature of a mullion. In some embodiments, the cross-sectional shape of the mullion body varies along a longitudinal length of the mullion body to accommodate variation in cross-sectional mullion shape.

Although the antenna wings shown in FIGS. 1 to 13 are substantially rectangular in shape (when viewed perpendicular to the vertical plane of the window lites), it will be appreciated that other antenna wing shapes are possible. For example, antenna wings may have straight or curved sides and may be regular or irregular in shape. Antenna wings may be triangular, quadrilateral, pentagonal, or hexagonal in shape, or have any other number of sides. Quadrilateral antenna wings may be rectangular (e.g. oblong or square), trapezial, trapezoidal or rhomboid in shape.

In certain embodiments, the antenna wings are oriented parallel to the mullion cap's long axis (i.e., the longitudinal axis). In certain embodiments, the antenna wings are oriented orthogonal to the mullion cap's long axis (i.e., the longitudinal axis). In yet further embodiments, the antenna wings are inclined with respect to the mullion cap's long axis (i.e., the longitudinal axis).

In some embodiments, the antenna wings do not have a longer (i.e., major) axis, e.g. they are square. Generally speaking it is desirable to minimize the footprint of the antenna wings, since they are configured (e.g., arranged) in the viewable area of the window. In certain embodiments the antenna wings have a length that is at least 5 or at least 10 times their width, so as to minimize their visual impact. In such embodiments, the antenna wings may be configured (e.g., arranged) along a substantial portion of the edge of the lite, vertical or horizontal, in line with the mullion cap or orthogonal to it.

In some embodiments, such as those shown in FIGS. 1 to 13, the antenna wings are substantially planar. However, the profile of the antenna wings perpendicular to the plane of the lites may also be non-planar.

The dimensions of each antenna wing are typically small relative to the dimensions of the lite across part of which the antenna wing extends. In particular, the surface area of each antenna wing (when viewed perpendicular to the plane of the lite) is typically small relative to the surface area of the lite. For example, the surface area of the lite may be at least 50, or at least 100, times the surface area of the antenna wing.

It will be appreciated that the scale of one dimension of an antenna wing may be comparable to the scale of a corresponding dimension of the lite across part of which the antenna wing extends. For example, in some embodiments, an antenna wing may extend along the majority of (for example, the entirety of) the length of a first side of the lite. However, in such embodiments, the width of the antenna wing may advantageously be small relative to the length of a second side of the lite, the second side extending substantially perpendicular to the first side, such that the total surface area of the antenna wing remains small relative to the total surface area of the lite.

In some embodiments, antenna wings are removably or adjustably mounted to mullion cap bodies. For example, antenna wings and mullion cap bodies may be manufactured as separate components and antenna wings may be attached to mullion cap bodies prior to, or after, mounting the mullion cap bodies to mullions.

In some embodiments, the antenna wings are attached to the mullion cap body by a clamp. The clamp may provide for electrical connection between the antenna wings and the mullion cap body for transfer of signals between antennas in the antenna wings and electronics in the mullion cap body. For example, clamps may include electrical connectivity posts or pogo-pins configured to connect with antenna wings. Removable antenna wings may permit replacement or maintenance of antennas without requiring removal of the entire mullion cap and/or conform with positioning elements, if present, as described hereinabove.

In some embodiments, the antenna wings are arranged to lie against (i.e. in direct contact with) the corresponding lites when the mullion cap is mounted on a mullion. In other embodiments, the antenna wings are spaced apart from the surfaces of the lites (such that there is an air gap between the antenna wings and the lite surfaces), for example by a small distance such as at least 1 mm, or at least 5 mm, or at least 1 cm. The spacing between the antenna wings and the lite surfaces may be determined by the mullion cap body, for example by the shape and dimensions of the mullion cap body. In some embodiments, the spacing between the antenna wings and the lite surfaces is adjustable.

In some embodiments, each mullion cap supports two or more antenna wings. For example, in some embodiments, each mullion cap supports two or more antenna wings spaced vertically (i.e. longitudinally) apart from one another. In some embodiments, each mullion cap supports two or more antenna wings spaced apart from one another along a single (i.e. the same) edge of a lite. In other embodiments, multiple mullion caps may be installed on a single mullion to enable placement of multiple antenna wings along a single (i.e. the same) edge of a lite.

It will be appreciated that, although the discussion hereinabove relates primarily to the mounting of mullion caps to vertical mullions, all such mullion caps could also be mounted to horizontal mullions in order to arrange antenna wings along horizontal edges of lites. Accordingly, it will be understood that all references to 'vertical' and 'vertically' can be replaced by 'horizonal' and 'horizontally', and vice-versa. Indeed, all mullion caps disclosed herein could be mounted to mullions inclined at any angle with respect to the horizontal or vertical.

The mullion caps disclosed herein enable antennas (by way of the antenna wings) to be mounted to window structures via mullions. The placement of the antennas in the antenna wings, which each extend across a respective portion of the corresponding lite, enable signals to be transmitted and/or received wirelessly across (i.e. through) the window lites. In some embodiments, this enables communications signals, such as cellular network signals, to be transceived across (i.e. through) the window lites. By mounting the mullion caps, and therefore the corresponding antenna wings, on the mullions in the interior of the building, the antennas are also are protected against exposure to the elements (i.e. the weather) outside the building. Moreover, the use of mullion caps to mount the antennas to the windows enables antennas, in some embodiments, to be retrofitted to existing window structures with minimal or no structural modifications required. For example, use of mullion caps to mount antennas to existing window structures enables communications to be transmitted between the interior and the exterior of a building while avoiding a need to drill holes through existing walls or mullions between the interior and the exterior of the building.

In the embodiments shown in FIGS. 1 to 13, the mullion cap bodies house communications components, such as transceivers or radios, for transmitting or receiving communications signals by way of the antennas in the respective antenna wing(s). In some embodiments, the radio is configurable such as a VRAN (virtual radio access network) transceiver such as described in described in Patent Application No. PCT/US20/32269.

Buildings in which mullion caps described herein are installed may include a communications infrastructure into which the mullion caps are integrated. For example, the communications infrastructure may include a high-speed optical fiber building communications network including multiple network switches, control panels, and/or building devices. Details of such communications infrastructures are described in Patent Application No. PCT/US20/32269, entitled "ANTENNA SYSTEMS FOR CONTROLLED COVERAGE IN BUILDINGS", filed May 21, 2020 and U.S. Provisional Patent Application Nos. 62/977,001, 62/978,755 and 63/027,452, the disclosures of which are hereby incorporated in their entirety into the present application.

In some embodiments, the communications infrastructure of the building is connected to an external network, for example by a backhaul such as high-speed fiber optic line. The external network may be an external cellular network such as a 3G, 4G or 5G network. Accordingly, by integration into the communications infrastructure of the building, the mullion caps may also be connected to the external network. In some embodiments, the antennas of the mullion caps are used to wirelessly extend connection to the external network, through the windows, to the exterior of the building. For example, the antennas of the mullion caps may be used to extend 5G cellular network coverage, provided by the backhaul, to areas surrounding the exterior of the building.

While the embodiments described above contemplated attaching an antenna structure to a mullion, other building structural components may be used in place of mullions. Generally such a building structural component abuts or is proximate to a window. In some cases, such a structural component is a permanent element of a building such as an element provided during construction. Examples include walls, partitions (e.g., office space partitions), doors, beams, stairs, façades, moldings, and transoms, etc. In various examples, the building structural elements are located on a building or room perimeter. In some cases, an antenna is installed on a fixture, which may be a post construction building installation. Examples include some types of lighting, work area structures such as cubicles, ceiling tiles, and the like. In some cases, an antenna is installed on an unfixed element such as an item of furniture. Examples of furniture on which an antenna may be installed includes desks, chairs, cabinets, artwork, and the like.

Examples of window components and associated building structural elements on which an antenna structure may be installed include: Frames, the framework that surrounds and supports the entire window system including a head, jambs and a sill, where the head is a horizontal part forming the top of the window frame; jambs are vertical parts forming the sides of a window frame, abutting or forming a part of a fixed part of the building (i.e., generally not contacted by windows on two sides); and the sill being a horizontal part forming the bottom of the frame of a window; jambliners, a strip which goes on the sides of a window frame that provides a snug fit for the window sash; grilles, decorative pieces that visually divide window panels, giving the glass the appearance of multiple glass panes; muttons, thin pieces of wood or other material that subdivide windows (e.g., multiple small windows in a door); and mullions, a major structural vertical or horizontal piece that separates two or more windows while supporting them.

Figure 18:
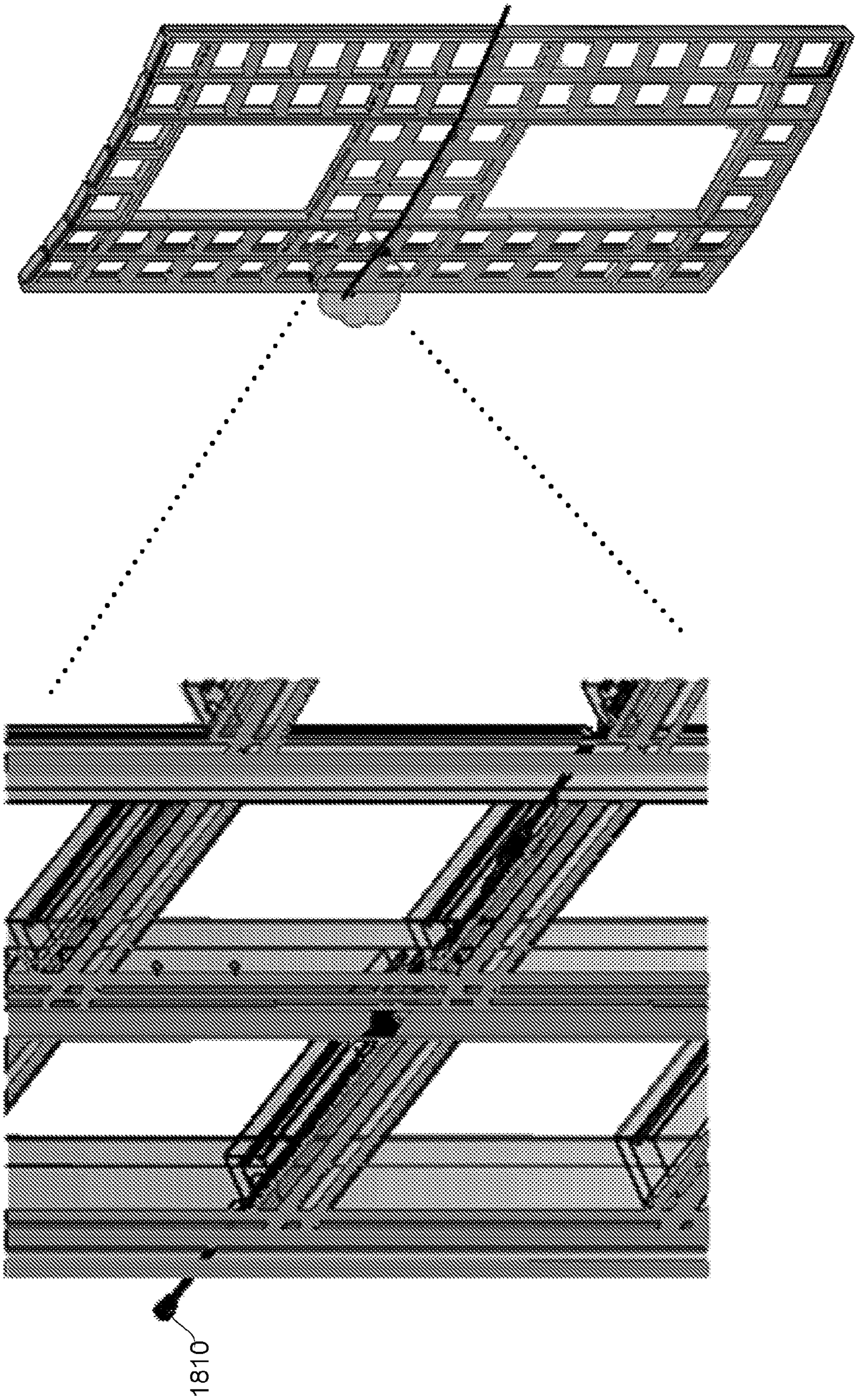
FIG. 18 is a simplified view of a portion of a framing structure providing several mullions to support windows on a façade or other building exterior structure.

Muttons are usually decorative rather than structural and may be oriented either horizontally or vertically. A mullion is a vertical or horizontal element that forms a division between units of a window or screen, and/or is used decoratively. When dividing adjacent window units, a mullion may provide a rigid support to the glazing of the window. It may also provide structural support to an arch or lintel above the window opening. Horizontal elements separating the head of a door from a window above are both a head jamb and horizontal mullion and are sometimes called "transoms." An example of a framing structure providing several mullions to support windows on a façade or other building exterior structure is depicted in FIG. 18. The illustrated network of mullions may provide pathways for electrical and/or light carrying lines and fibers, in the illustrated framing structure, pathway 1810, for example. They may also provide attachment points for mounting antennas, radios, controllers, sensors, and the like.

In some embodiments, the antenna system is bolted or clipped to a mullion or other building structure by including a hole in the mullion or other building structure to facilitate attachment to the building structure.

Antennas of the antenna structures may be oriented horizontally, vertically, or diagonally in a building. These directions may refer to not only the physical orientation of an antenna along its primary axis but additionally or alternatively to the orientation of a signal intensity or polarization (transmitted or received by an antenna). In certain embodiments, an antenna is mounted to a building structural element or other building feature that is vertically oriented. For example, an antenna may be mounted to a vertically oriented element that extends up to the ceiling. In certain embodiments, an antenna is mounted horizontally and provides a horizontally directed radiation pattern.

While much of the foregoing disclosure described windows on the edge or outer wall of a building, the present techniques are not limited to this. The concepts disclosed herein, including the antenna designs, supporting structures for antennas, and window modifications, apply to interior windows as well. Interior windows may be located in interior offices, inner walls, etc.

The window or other medium through which the antenna transceives electromagnetic signal may be transparent, translucent, opaque, etc. in the visible spectrum. In some embodiments, the medium is a window through which building occupants may view the outside world. In some embodiments, the medium is a window that allows diffuse solar radiation to enter the building. In some embodiments, the medium is spandrel glass or a spandrel window.

In some embodiments, the antenna is not actually attached to a mullion cap or other structure affixed to a building structural element. In some such embodiments, the antenna is disposed on the window itself as by adhesive or as a coating or etching. For example, a patch antenna, a strip antenna, a fractal antenna, etc. may be fabricated on the window itself. In such cases, an attenuating layer on the same or a different lite is selectively removed in the vicinity of the antenna as described herein.

Multiple Polarization Embodiments

In some embodiments, the window antenna system is designed or configured to transmit and/or receive radiofrequency signals in two polarization states (e.g., two orthogonal polarization states). In some cases, a single conductive antenna element provides the two orthogonal polarization states. In such cases, the window antenna system may have two ports and two transceivers to provide signals with two different polarization states.

In some cases, two conductive antenna elements are provided, one for each orthogonal polarization state. In some examples, one patch antenna is provided on each side of a mullion, with one antenna element on one window to provide communications in a first polarization state and a different antenna element on another window to provide communications in a second polarization state. In this example, the windows straddle a mullion.

Communication Between Antenna System and Building Exterior

As explained, the antenna system may be designed and installed to facilitate transmission of electromagnetic signals such as gigahertz range communication signals between a building's interior and exterior, particularly through a window such as a window having a low emissivity coating and/or an optically switchable device. In certain aspects, the communications signals are transmitted on a frequency band of at least 2 GHz, or on a frequency band of between about 2 GHz and 20 GHz. To facilitate such transmission, a window may be modified in a way that physically affects the transmission of electromagnetic waves across the window, e.g., between the interior and exterior of a building. In some aspects, such modification passively or actively effect transmission of electromagnetic waves through the window.

In particular embodiments, an antenna or array of antennas are placed in close proximity to or touching surface 4 of an insulated glass unit, so that communications to and from the antenna(s) can pass through the IGU. In particular embodiments, described in more detail herein, coatings on S1, S2, S3 and/or S4 that otherwise would inhibit or impede communications (an "RF attenuating" coating) through the IGU are ablated in the area where the antenna(s) are situated on or near the window at S4. In particular embodiments, an RF attenuating coating (e.g. a low emmissivity, photochromic, electrochromic or other coating) from S2 is first removed, patterned or otherwise ablated with a portable laser ablation tool, in order to retrofit the window to facilitate communication signals to and from the antenna(s). The removal may be a bulk removal, e.g. from a defined area approximating the area and registered with the antenna(s), or in some cases a particular pattern to allow communications through without having to remove the entirety of the RF attenuating coating in that area. In some cases, the RF attenuating coating is patterned for the specific purpose of aiding, shaping or focusing the communications coming to and from the antenna(s). The synergy of the antenna(s) placement in close proximity to or on S4, along with ablation of the coating(s) on S1-S4 as needed to allow and/or modify the communications through the IGU is an important feature of certain embodiments. One embodiment is a method of configuring a building to transmit and receive cellular communications, e.g. 5G communications, including 1) removing one or more coatings on one or more surfaces of an IGU, 2) configuring one or more antennas on or proximate surface 4 of the IGU and registered with the area in which the one or more coatings were removed in 1), wherein the removal of the one or more coatings allows and/or modifies transmission or reception of the cellular communications.

In various aspects, the antenna systems described herein may be deployed on the ground floor and/or lower floors of a building (e.g., on the $10^{th}$ or lower floors or on the $5^{th}$ or lower floors). This may facilitate good cellular coverage on the street outside a building. For an additional description of building antennas and their uses, see Patent Application No. PCT/US20/3226962, incorporated, hereinabove, by reference into the present application.

Window Antenna Systems for Receiving Exterior Wireless Signals

In some embodiments, components of the window antenna system are designed or tuned to optimize reception of cellular communication signals transmitted from a source outside the building. In the absence of the presently disclosed embodiments, reception of such cell signals inside the building may be relatively poor. If one or more cellular towers is located in the vicinity of a building that would otherwise have poor interior cellular reception, window antenna elements and/or RF coating ablation methods may be designed or tuned to facilitate reception of the cellular signal in the region of the building closest to the source of external cellular signals. In some cases, designing or tuning of the elements of the window antenna involves (a) locating antennas on a particular region of the building (e.g., an east facing side of the building that is within the line of sight of a cell tower), (b) tuning reception properties of the radio receiver, and/or (c) defining the shape, size, and/or location of the uncoated region. In the case of the latter item, a cross-shaped uncoated region may be employed, for example.

Arrays of Building Antenna Systems

Antennas from multiple window antenna systems may be configured to work together to transceive wireless radio frequency signals to or from particular locations, optionally using spatial filtering and/or other beamforming techniques. Such techniques may have various applications. In some cases, the antennas work together to define wireless coverage to users within a building, when a cell tower or other external cellular signal source provides coverage in the vicinity of the building. In some cases, the antenna systems as described herein may be configured to work together to define wireless coverage to users outside, but near, a building, such as at street level or in an adjacent building (e.g., across the street). In such cases, the building's internal communications infrastructure (e.g., wiring, switches, processing logic, memory, and antennas) may serve as an extension or component of the cellular carrier's service. In some cases, the antenna systems work together to create a high power, high capacity source of cellular coverage, e.g., in the manner of a cellular tower.

In certain embodiments, antenna systems, e.g. mullion caps, located at two or more windows are employed to form antenna arrays. Some embodiments employ 2×2 antenna arrays, or 4×4 antenna arrays, or 16×16 antenna arrays, or 32×32 antenna arrays, or 64×64 antenna arrays, or 128×128 antenna arrays, etc. Any of these can be configured in a (multiple-input multiple-output) (MIMO) configuration, e.g., a massive MIMO configuration. Antenna wings as described herein may themselves employ MIMO antennas, and in addition or in the alternative, antenna arrays formed from multiple such antenna wings.

Beamforming techniques may employ active interference, null forming, and other techniques. Such techniques can form complex signal peaks and null regions tailored to locations of user equipment. The signal peaks can be formed at locations of devices that need to communicate over a channel having the signal peak. Signal null regions can be formed at locations where other devices are located that are not communicating over the channel. The null regions may appear as a low level signal or noise, so that devices in the vicinity ignore or suppress it. One embodiment is beamforming using mullion caps as described herein.

Signal adjustments required to provide such peaks and null regions may be made in the digital and/or the analog domain. Adjustments in the analog domain may be made to the phase, amplitude, and/or other characteristic(s) of the signals transmitted from individual antennas of the array.

Adjustments in the digital domain may be made to define locations of signal beam foci and null areas. The digital cellular communications logic may dynamically update maps of where user equipment is located. Digital parameters are adjusted to steer the signal where desired. For example, in a multi-user MIMO scenario where there are, for example, three user devices handled by a MIMO array at any given time, the digital control logic may define, for one channel, a region of constructive maximum signal near a known location of a device communicating on that channel, and define null regions at known locations of other users on other channels. The digital information defining such locations may be pushed to the analog domain where the mullion cap antennas launch the signals with appropriate beamforming parameters.

Uncoated Region of a Window

As explained above, conductive window coatings can strongly attenuate high frequency electromagnetic signals such as those used in 5G cellular protocol. Some prior approaches to address this issue employed large repeater designs that, while moderately effective for relatively low frequency transmissions, are relatively ineffective for high frequency transmissions. Other prior approaches employed modifications to building structural components such as holes that might compromise the integrity and/or weather proofing of the building. Unlike such approaches, aspects of this disclosure employ a modified window structure that selectively removes conductive layers on one or more window surfaces. Such modifications reduce the attenuation of electromagnetic signal passing through the window, to or from an antenna system. One aspect is to remove as small a portion of the coating as possible, and to configure analogously small antenna arrays (e.g. in antenna wings of mullion caps) so as to maximize coverage and signal, while minimizing physical footprint and impact to aesthetic features of the window and mullion.

For example, a window proximate to an antenna system may be modified locally, e.g. laser ablated, to reduce attenuation by selectively removing material in the vicinity of an antenna, for example an antenna wing of a mullion cap. The material removed may be in the form of a coating on the window. Examples of such coatings include low emissivity coatings, antireflective coatings, optically switchable devices such as electrochromic devices, and the like. The coating or coatings may be on S1, S2, S3 and/or S4 of a double pane IGU. The material removed may include electrically conductive, semiconductive, dielectric and/or insulating materials. Examples include metals such as silver, gold, aluminum, and combinations thereof including, e.g., alloys and mixtures. Other materials include transparent metal oxides such as indium tin oxide, titanium oxide, fluorine doped tin oxide, and combinations thereof. In some cases, the material is a conductive polymer or gel.

In some cases, material of a window coating is removed in the vicinity of the antenna's installed location. The area of removal may correspond to the area of an antenna wing or only correspond to radiating elements of the antenna wing. For example, when the antenna is located at the edge of a window, the removed material may also be at that edge of the window, optionally touching the edge of the viewable area of the window. In some cases, the material removed is in a first region that overlaps with or is encompassed by a region of the antenna's installed location (a second region). In some cases, the first region falls within the second region and extends beyond it. In some cases, not all material within the first region is removed. For example, a pattern of removed material may exist within the first region such as the case where the first region has a generally rectangular shape but regions of removed material within the first region have a serpentine, random, or crosshatched pattern. In some examples, less than the full thickness of a coating material is removed. In other words, the coating material is thinned rather than completely removed. In some cases, only a portion of an electrochromic device is removed. For example, the material of the device may be removed down to, but not including, a lower transparent conductive layer. In other embodiments, all coatings are removed The material removed may exist on one or more surfaces of a window, e.g. an IGU. In the case of a multi-pane window such as a double or triple pane IGU, the material may be removed from any surface or combination of surfaces of the IGU where a coating has been applied. In some cases, a portion of a coating is removed from S2 of a double pane IGU, where S1 is an exterior facing surface of the IGU and S4 is the interior facing surface of the IGU. In some cases, a portion of an electrochromic device is removed from S2 of a double pane IGU. In certain embodiments of antenna systems described, e.g. mullion caps, a low-E coating is selectively ablated as described herein in order to facilitate a transceiver of the antenna system to pass and receive signals through the window. These methods are particularly useful in retrofit applications where low-E windows are installed, and antenna systems as described are desired.

Window antenna systems may employ various shapes, sizes, and/or locations of uncoated regions on a window surface. These features of the uncoated region may be chosen to facilitate transmission of RF energy from the window antenna system to the exterior of the building.

In certain embodiments, the uncoated region has a generally annular shape. In some such cases, the annular region overlaps, at least to some degree, with the location of the conductive antenna element. The overlap may be defined in the x,y plane (where the z direction is normal to the face of a window's surface).

In certain embodiments, the uncoated region has a primary region such as, for example, an annular region or a polygonal region, and an ancillary or secondary region. In some cases, the ancillary region includes meander lines that are not part of the primary region but extend therefrom. In one example, an annular region of material removal has meander lines that extend into the inner region of conductive material that is surrounded by the annular region of uncoated region.

Figure 15:
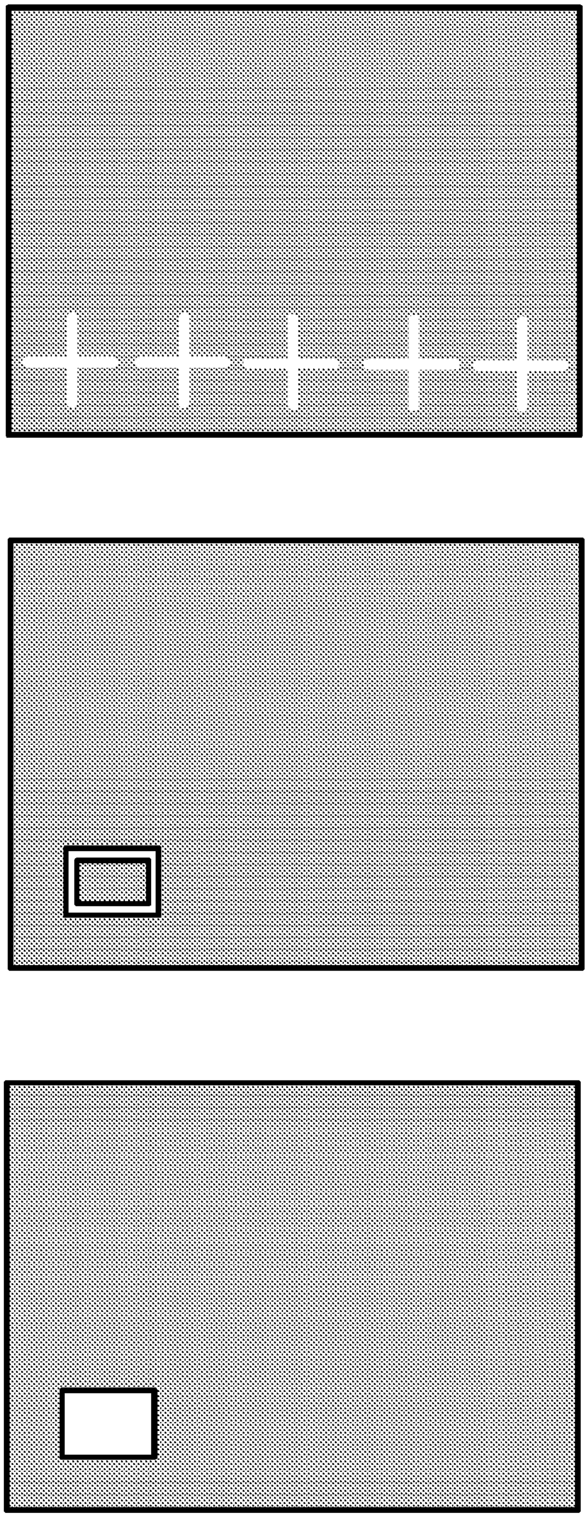
FIG. 15 shows examples of shapes of an uncoated region.

As shown in of FIG. 15, examples of the region's shape include polygonal areas where the coating or coatings are fully removed, ring shaped areas where only the perimeter is removed, intersecting lines such as cross-shaped areas, etc. Again, this removal may be from one or multiple surfaces, e.g. in FIG. 15, the rectangular area in the left-most depiction may represent removal of coating from one, two, three or four surfaces (of S1-S4) of e.g. a double-pane IGU, where two- and three-surface removal may be from any combination of surfaces of that number, e.g. removal from S1 and S2, or from S1 and S3, or S1 and S4, or S2 and S3, or S2 and S4, or S3 and S4 for two-surface removal.

Note that in certain embodiments, the area of the uncoated region of the window is relatively small, e.g., less than about 5% of the area of the coated region. In certain embodiments, the area of the uncoated region of the window is relatively small, e.g., less than about 2% of the area of the coated region.

Process of Modifying Windows to Selectively Reduce Attenuation

Attenuating material may be removed from a window before, during, and/or after installation of the window in a building. In some cases, the material is removed during fabrication of an IGU or other window structure used for installation in a building. In some cases, the material is removed after installation of a window or even during retrofit of a window and/or an antenna. In some aspects, a window modified to remove attenuating material includes an optically switchable device such as an electrochromic device. In other cases, a window does not have an optically switchable device. In certain embodiments, low-E, photochromic, thermochromic, electrochromic or other signal attenuating coatings are selectively applied so as to accommodate mullion caps as described herein. For example, masks may be used, corresponding to the footprint and location of the antenna wings, to prevent such coatings from being applied to those areas of the glass. In other embodiments, the coatings are selectively applied to the area of the glass except where antenna wings will be registered with the glass.

In some cases, an optically switchable device is included in a window but the device is modified in a manner that remove some of the device or some of the device's material in the vicinity where an antenna structure will be disposed when a building is constructed. In one approach, an optically switchable device is fabricated on a window in a conventional manner, but after the fabrication is complete, a portion of the device is removed. The portion of the device may be removed by various techniques such as optical techniques, mechanical techniques, thermal techniques, or chemical techniques. Examples of optical techniques include laser ablation and the like. Examples of mechanical techniques include grinding, scraping, and the like. Examples of chemical techniques include etching, dissolving, reacting (e.g., oxidizing or reducing), and the like. Other examples involve exposure to a plasma.

In another approach, rather than removing a portion of an optically switchable device after fabrication is complete, the optically switchable device is fabricated on a window in a manner that does not create the device in a region or regions selected to be free of the device in order to facilitate transmission of electromagnetic energy. For example, a mask may be employed to block fabrication of the device in such region or regions.

In some cases, an optically switchable device is included in a window as fabricated, and the device is modified only after installation. As in other cases, the modification involves removing some of the device or some of the device's material in the vicinity of where an antenna structure is to be deployed, but here the material removal is accomplished only after the window is installed. In other words, the window is fabricated with the device covering the region where it could unduly attenuate transmission of electromagnetic signals unless removed. In some approaches, an optically switchable device on an installed window is selectively removed using a portable device. An example of such portable device is a portable laser ablation device as described below. The optically switchable device may be modified at any time after installation. For example, it may be modified at a time when a building's owner decides to retrofit the building with antennas of the types described herein.

In some cases, an optically switchable device is not included in a window, but the window has a different type of attenuating coating such as a passive coating. One common example so such coating is a low emissivity coating which may include, e.g., a thin layer of silver. Prior to installation, the window is modified or fabricated in a manner that removes some of the attenuating material in the vicinity of where an antenna structure will be disposed when a building is constructed. In one approach, the window is fabricated in a conventional manner, but after the fabrication is complete, the portion of the attenuating coating is removed. The portion of the coating may be removed by various techniques such as those described for removing an optically switchable device. In some cases, the window is fabricated in a way that does not provide the attenuating coating in a region selected for it to be absent. This may be accomplished in various ways such as by applying a mask to the region prior to application of the coating.

In some cases, a passive coating, such as a low emissivity coating, is included in a window as fabricated, and the coating is modified only after installation. The modification involves removing some of the coating in the vicinity of where an antenna structure is to be located. In this case, the window is fabricated with the coating covering the region where it would unduly attenuate transmission of electromagnetic signals unless removed. In some approaches, the passive coating is selectively removed using a portable device. An example of such portable device is a portable laser ablation device as described below. The passive coating may be selectively removed at any time after installation. For example, it may be modified at a time when a building's owner decides to retrofit the building with antennas of the types described herein.

In some embodiments, lites of a window are laminates, each laminate comprising two or more panes adhered to one another, for example with functional (e.g. electrochromic) device layers provided thereon or therebetween. In some embodiments, the presence of a lamination adhesive between panes is taken into account when focusing a laser and/or ablating coatings from laminate lites. In some embodiments, the presence of the lamination adhesive is taken into account during the ablation process so as not to occlude or otherwise interfere with the transmission of radio signals through the lite.

In some embodiments, when a window's passive or active material is modified after the window is installed, the modification may be accomplished using a portable device such as one that employs focused laser ablation to selectively remove the material. Examples of such portable devices include devices similar or identical to laser ablation devices described in U.S. Pat. No. 9,885,934, which is incorporated herein by reference in its entirety.

In some cases, the portable device is positioned to remove a portion of a coating using a flying device such as an aerial drone or other unmanned vehicle. Such approach is particularly useful when removing material on windows above ground level in a building. The drone may temporarily attach itself to the window and/or framing during ablation processing, or not. In one embodiment, a clamping mechanism attaches to the mullion on the exterior of the building. The drone mitigation device uses the mullion and window surfaces to register and align its ablation components appropriately. The ablation process is undertaken. In certain embodiments, when attached to the building, the drone propulsion mechanism is turned off during ablation processing. In such cases, the propulsion system is turned back on prior to detachment from the building. In some cases, during material removal, a beam blocking element is employed to prevent the laser from passing significantly beyond the window to regions where it could injure people or property. Examples of types of beam blocking element are presented in in U.S. Pat. No. 9,885,934, and previously incorporated herein by reference in its entirety. In some cases, the beam blocking element is positioned by drones or other unmanned flying vehicles.

Window Antenna Systems Utilizing Window Reflective Surface(s)

Introduction and Overview

In certain embodiments, a conductive antenna element such as a patch antenna works in concert with a nearby window to form a single antenna unit, sometimes referred to herein as a window antenna system. Windows, even those with regions where some conductive coating is removed, may reflect electromagnetic radiation back toward the conductive antenna element where it can interfere with the propagation of radio frequency energy (and associated electromagnetic communications). By designing the antenna to account for such reflections, the conductive antenna element and the window work together to transceive electromagnetic communications through the window. In such designs, the conductive antenna element is an active element and the window is a passive element. The conductive antenna element is electrically coupled to a radio or transceiver.

As explained elsewhere herein, windows often have conductive coatings, a portion of which is removed, or not formed, in order to facilitate transmission of electromagnetic radiation outside the window. In some window antenna systems, the location, size, shape, and/or pattern of the uncoated region is selected to facilitate operation of the overall antenna system that includes the window and coating.

Further, in certain embodiments, the window antenna system has compensation circuitry to counteract and/or work together with the effects of the window. In certain embodiments, the electrically conductive antenna element and the uncoated regions of a window are designed in conjunction with compensation circuitry to account for the reflections and/or attenuation caused by the window and its coating(s).

Thus, in some cases, the window antenna system includes the following components: (a) a transmitter and/or a receiver, (b) an electrically conductive antenna element (such as a patch), (c) one or more windows, at least one of which has coated and uncoated regions of an electrically conductive coating, and (d) compensation circuitry that accounts for the interaction of the window with the conductive antenna element. The compensation circuitry facilitates transmission outside the window. In certain embodiments, the compensation circuitry is incorporated into the transmitter and/or receiver. In other embodiments, the compensation circuitry is separate from the transmitter and/or receiver.

A conductive coating such as a low emissivity coating may reflect the vast majority of incident radio frequency energy and it may also absorb a portion of such energy. For example, in some cases, as a result of reflection and/or attenuation a window with a low emissivity coating may permit transmission of less than $1/1000^{th}$ of incident RF energy (i.e. transmission loss of at least −30 dB). Reflection is the portion of the electromagnetic energy that bounces off the window. Attenuation is the portion of the wave energy that is absorbed by the medium. Attenuation of a wave involves an interaction in which the wave oscillates in a medium where its energy tends to dissipate as the heat rather than providing propagation through space. In certain embodiments, a window antenna system, and particularly the compensating circuitry, is designed to account for both reflection and attenuation.

As indicated above, a conductive antenna radiating element such as a patch radiating element may be disposed flush with or close to a window in a window antenna system. For example, the window surface closest to the antenna element may be substantially parallel to a planar face of the radiating element and be separated therefrom, on average, by less than about ten centimeters. At such separation distances, the reflection and attenuation caused by the window have near-field interactions (evanescent), which are different from plane wave interactions. Antenna system designs, advantageously, account for these nearfield interactions because coating free regions that pass energy emitted from an antenna far from the glass regions will behave differently when passing energy from an antenna that is near the window.

In certain cases, window antenna designs utilize reflection off of windows to create and maintain a standing wave between or near the conductive antenna element and the window. The standing wave may be localized between the conductive antenna element and the reflective surface(s) of the one or more windows. A certain fraction of energy of the standing wave is transmitted into space in the direction outside of or through the window.

To accomplish an appropriate interaction between the conductive antenna element and the window and its patterned conductive surface, compensating circuitry may be configured to account for reflections back toward the conductive antenna element. In some cases, the compensating circuitry produces a signal that is approximately 180° out of phase with the reflected electromagnetic signal that returns to the antenna element from the window surface(s). This effectively cancels the reflected component of the signal that would otherwise be coupled back into the window conductive antenna element and toward the radio.

To effectively set the desired resonating conditions in the window antenna system, the compensating circuitry must account for the time it takes a signal from the antenna element to reach a reflective window surface and reflect back to the antenna element. It may also account for the magnitude of the reflected signal, which is a function of the reflectivity of the window surface. Further, it may account for these considerations for each of multiple reflective surfaces provided by the window.

Figure 16:
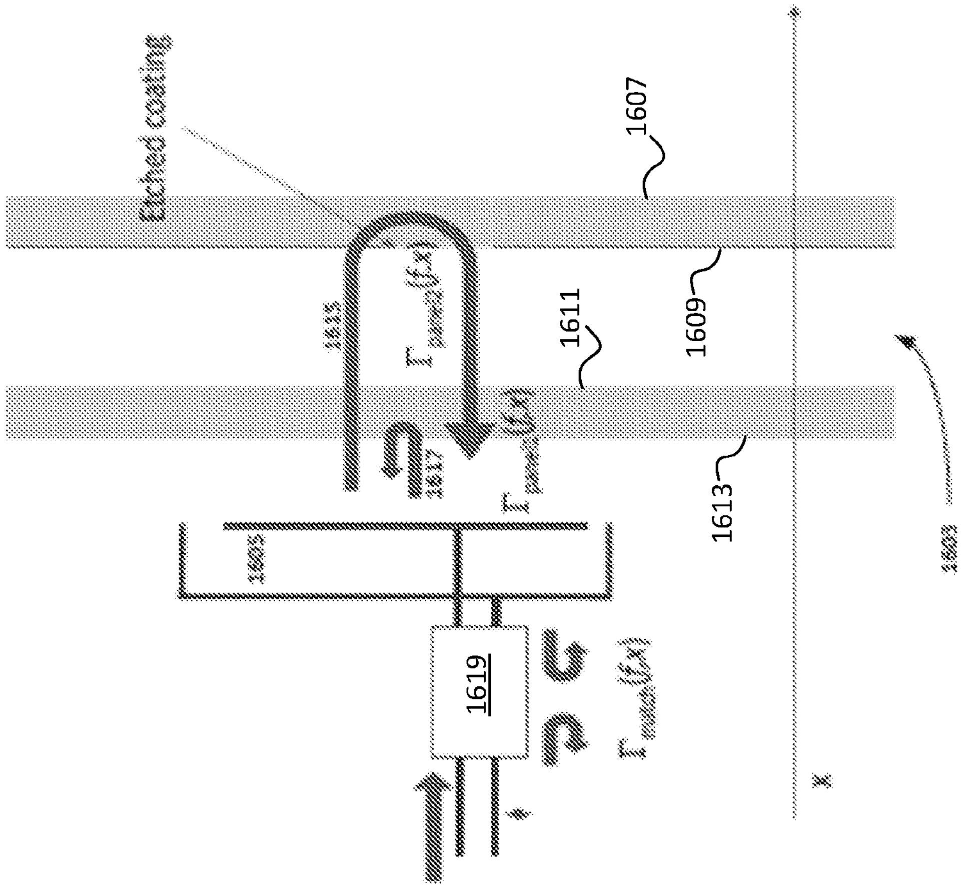
FIG. 16 shows a window antenna system in which a patch antenna element 1605 located proximate to and substantially parallel with a dual pane window.

FIG. 16 shows a window antenna system in which a patch antenna element 1605 is located proximate to and substantially parallel with a dual pane window 1603, which has an exterior surface 1607 (sometimes referred to as S1), an interior surface 1613 (sometimes referred to as S4), and internal surfaces 1609 (sometimes referred to as S2) and 1611 (sometimes referred to as S3). In this example, surface 1609 has a conductive coating such as a low emissivity coating or an electrochromic device that is selectively removed to produce an uncoated region. Reflections of RF energy from surfaces 1609 and 1613 are illustrated by arrows 1615 and 1617, respectively. Both of these reflections reach patch antenna element 1605, but very little of the reflected signal is transmitted back toward a radio (not shown) because tunable matching circuit (compensating circuitry) 1619 applies compensating signals to patch antenna element 1605.

Figure 17:
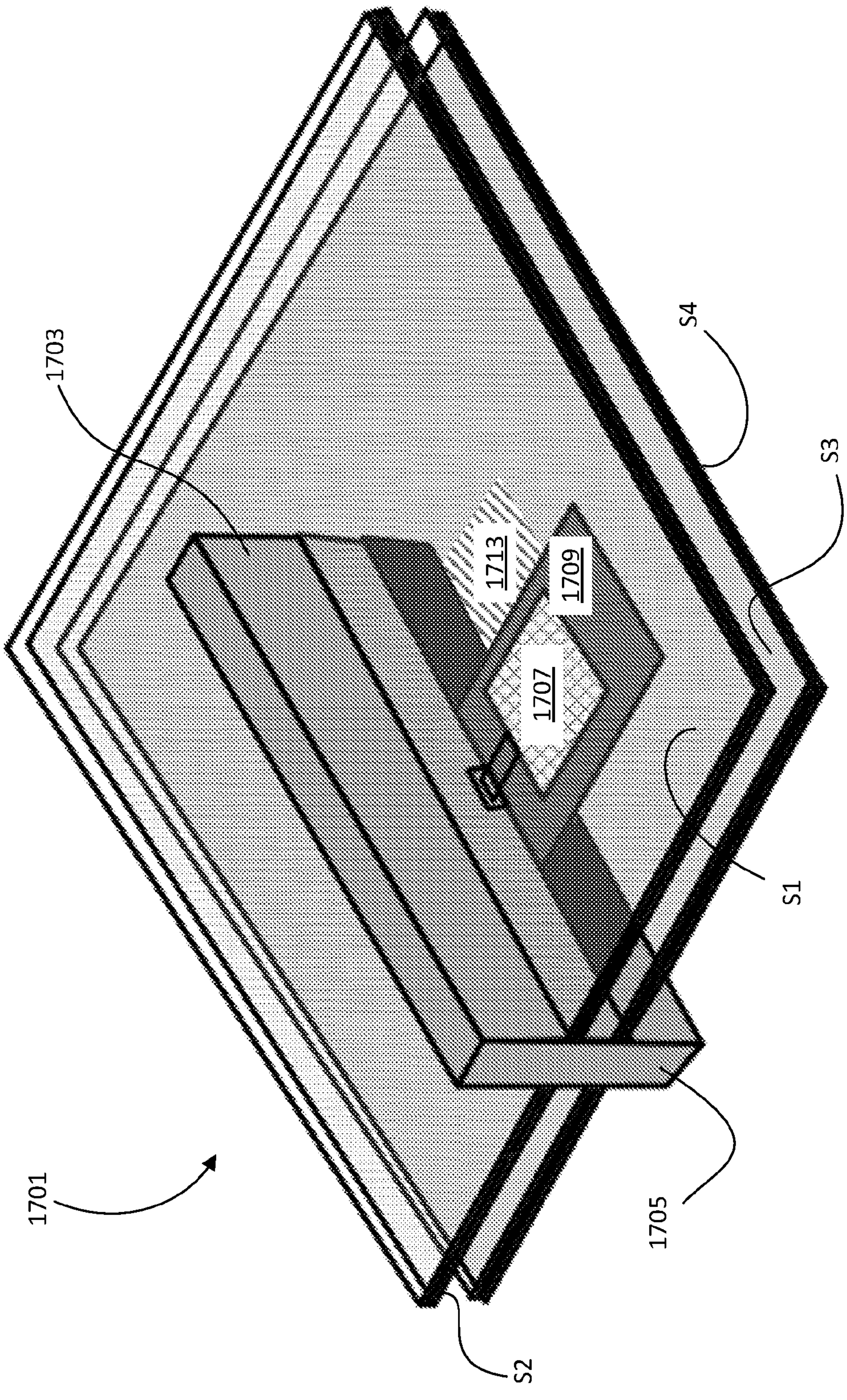
FIG. 17 shows a window antenna system disposed on a mullion and including a dual pane window and a patch antenna element disposed on an antenna housing.

FIG. 17 shows window antenna system 1701 disposed on a mullion 1703 and including a dual pane window 1705 and a patch antenna element 1707 disposed on an antenna housing 1709. Dual pane window 1705 has four surfaces, S1-S4, with a conductive coating 1711 on surface S2. S1 is on the building exterior. Surface S2 has an uncoated region 1713 that extends under and beyond patch antenna element 1707. The radio and compensating circuitry of window antenna system 1701 are not shown. In some cases, they are disposed within mullion 1703. In other cases, they be disposed on the back of the conductive patch antenna element 1707.

Design Variations for Different Types of Window

If every window was configured identically, then a single compensating circuit could be deployed. However, windows have many different properties. For example, integrated glass units (IGUs) may have different thicknesses of glass and different separation distances between the inner surfaces of the two or more glass panes. These different distances produce different times-of-flight of RF signals propagated by the conductive antenna element and reflected off one or more glass surfaces back to the antenna element. Additionally, different windows have different types of coating, with different electrical properties that affect the amplitude of signal that is reflected back to the antenna element.

Therefore, in some cases, the compensating circuitry is flexible or tunable to allow it to be deployed on different types of windows. In certain embodiments, the compensating circuitry is configured to tune the compensating signal it applies to the conductive antenna element to account for differences in time-of-flight of reflected signals for different distances between the conductive antenna element and the reflective surface(s) of a window. It may also be tuned to account for different magnitudes of the reflected signal, which are a function of, inter alia, the reflectivity of the surface that is reflecting the signal.

In some cases, the window uncoated region is also chosen to account for different window designs. In other words, the shape, dimensions, and location of the uncoated region may be selected to account for the particular types of window for which the window antenna system is designed.

In certain embodiments, to account for different separation distances between window surfaces, the compensating circuitry employs a variable capacitor (e.g., a varactor) to tune its response. In certain embodiments, to account for different separation distances between window surfaces, the compensating circuitry employs a micro-electromechanical system (MEMS) device in which a cantilever or other oscillating structure is varied to implement the tuning.

As an adjunct to the compensating circuitry or as part of the compensating circuitry, a mechanism is provided for determining parameters for the window in which the window antenna is deployed. As indicated above, these parameters may include the separation distance between the conductive antenna element and one or more reflective surfaces of the window, and optionally the physical properties of the glass coating, which properties influence the magnitude of the reflected signal. When these parameters are known, the compensating circuitry can be appropriately tuned.

In some embodiments, a mechanism associated with the compensating circuitry is able to probe the windows and measure reflected signal in order to determine how to appropriately tune the compensating circuitry. In other embodiments, an IGU or other window, as provided by a supplier, contains information that provides these parameters. As an example, an IGU may include a barcode, a QR code, an RFID, or other in appropriate indicator of the parameters that can be read by the compensating circuitry or associated processing module. In yet another embodiment, a laser ablation tool or other tool used to selectively remove the conductive coating may be configured to provide information about some parameters such as the relative positions of the reflective surface(s), and hence the separation distance between the conductive antenna element and the reflective surfaces.

Active Interference Cancelling Using Window Antenna Systems

In certain embodiments, a window antenna system or associated circuitry is configured to perform or participate in active interference cancelling. In current technology, cell phones and cell towers both participate in interference cancelling. The goal is to allow user devices such as mobile phones to preferentially receive the strongest signal and ignore or suppress weaker, interfering, signals.

The need for active interference cancelling arises for various reasons such as because wireless signals can reflect off various structures including walls, windows, etc., and because cell towers may compete to connect to a phone or other user device. Internal reflections cause time of flight differences for the same communication reaching the device, leading to interference. And signals from multiple external sources such as multiple cell towers likewise produce interference.

To implement active interference cancelling, user equipment is sometimes configured with software or other logic that allows it to detect the strongest inbound signal and to block weaker signals by transmitting blocking signals or otherwise suppressing the weaker signals. As the user equipment moves around, this relationship changes, so the user equipment may be configured to dynamically perform the analysis and blocking. In other words, the user equipment must, at times, switch between signals in order to receive the best signal. Also, as the incoming signal's strength varies over time, the user equipment may similarly identify new "best" signals and block weak signals.

In some cases, wireless modems, base stations, and/or cell towers are configured to determine where a user device is currently located. It may do this by, for example, sending and receiving a training sequence. Regardless of how the current location is determined, the model, base station, or tower employs digital and/or analog signal propagation logic to direct the wireless signal intensity peaks to the current location of the user device. For example, in a MIMO (multiple-input multiple-output) antenna configuration, the phase and amplitude of transmissions from various component antennas may be tuned to launch wireless signal with the determined beamforming characteristics. The wireless infrastructure may also be configured to shape the transmitted wireless signal to cause null or low signal strength regions where other user devices are known to be currently located. In some cases, the window antenna system is configured to apply the inverse of wireless signals identified for suppression and thereby spare the user device from this effort.

Regardless of how the transmitted signal is defined and controlled, at least a portion of the effort to identify the strongest signal and to cancel the weaker signals is performed by the mobile device or other user equipment. This consumes power at the local device, which accelerates battery discharge, and may, over the long term, reduce the battery's lifetime.

In certain embodiments, a window antenna system or associated circuitry is configured to perform some or all of this function, i.e., identify the strongest signal and cancel the weaker signals. This reduces the burden on the user equipment and extends the battery's charge time. The window antenna system may be hard wired to a power source, which provides a reliable source of power to perform these functions.

Participation of the window antenna systems in active interference cancellation may be particularly useful in controlling signals from outside a building to user equipment inside the building. In certain embodiments, a window antenna system is configured to (a) determine which of many incoming wireless signals is most appropriate for one or more user equipment devices in the vicinity of the system, and (b) selectively transmit that signal to the local device(s). In some embodiments, the window antenna system accomplishes this by cancelling or suppressing undesirable incoming signals. In some embodiments, the window antenna system accomplishes this by beamforming techniques so that desired signals are focused in at or near a mobile user device and/or undesirable signals directed to locations away for the device (possibly toward a different device that can use such signals). In some cases, the window antenna system operates as a relay to receive and then retransmit only signals needed by the local user equipment devices. In some cases, the window antenna system works in concert with passive or active window devices or coatings that selectively block and transmit particular regions of the radio frequency spectrum.

In certain embodiments, the active interference cancellation logic is deployed in a building network locally, e.g. in the window antenna system. In certain embodiments, the active interference cancellation logic is deployed remotely such as on a server in the building (e.g., a master controller) or even outside the building, such as on a geographically distant server connected by a network, e.g., a public network

CONCLUSION

It should be understood that the certain embodiments described herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer-readable medium, such as a random-access memory (RAM), a read-only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Additionally, one or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure. Accordingly, the present embodiments are to be considered as illustrative and not restrictive, and the embodiments are not to be limited to the details given herein.

What is claimed is:

1. A system for transceiving radio frequency (RF) signals, the system comprising:

(a) a window having a first surface facing, when installed in a building, an interior of the building; and (b) an antenna arrangement configured to attach to a structure proximate to the first surface, wherein the antenna arrangement comprises one or more radiating elements configured to transceive the RF signals through the window; wherein:

the window includes a coating disposed on the first surface and/or on another surface parallel to the first surface, the coating (i) being an electrochromic device, (ii) having a low emissivity, and/or being antireflective;

the coating excludes a region proximate to the radiating elements; and the region is formed by removing material from a portion of the coating, the material removed including transparent metal oxides and/or a conductive polymer or gel.

2. The system of claim 1, wherein the removing is configured to create a pattern of removed and unremoved material that allows passive modification of electromagnetic energy passing through the window.

3. The system of claim 1, wherein the removing is configured for facilitating reception of a cellular signal by tuning reception properties of a radio receiver.

4. The system of claim 1, wherein the removing reduces attenuation by selectively removing material proximate to the radiating elements.

5. The system of claim 1, wherein the removing is executed after the window is installed in the building.

6. The system of claim 5, wherein the removing is executed using a portable device employs focused laser.

7. The system of claim 1, wherein the structure proximate to the first surface is a window frame structure or a mullion.

8. The system of claim 7, wherein a mullion cap is disposed with the mullion, the mullion cap including a mullion cap body and at least one antenna wing, the antenna wing including the one or more radiating elements.

9. The system of claim 8, wherein the mullion cap body is substantially elongate, extending, along an axis parallel to a longitudinal axis of the mullion.

10. The system of claim 9, wherein the mullion cap body is substantially L-shaped in cross-section in a plane perpendicular to the longitudinal axis of the mullion.

11. The system of claim 8, wherein the mullion cap supports two or more antenna wings.

12. The system of claim 8, wherein the at least one antenna wing includes a glass substrate with the one or more radiating elements formed thereon.

13. The system of claim 12, wherein the at least one antenna wing is substantially transparent.

14. The system of claim 12, wherein the glass substrate comprises a low alkali thin glass or a fusion drawn glass.

15. The system of claim 12, wherein the one or more radiating elements are laser etched from one or more transparent coatings on the glass substrate.

16. The system of claim 15, wherein the transparent coatings include conductive metal oxide coatings.

17. The system of claim 8, wherein the mullion cap includes vents extending from a proximal portion of the mullion cap body to a distal portion of the mullion cap body.

18. The system of claim 17, wherein, at the proximal portion of the mullion cap body, the vents are configured to provide for air intake to cool the mullion cap and/or communications electronics housed therein and include an exit at the distal portion of the mullion cap body to facilitate air exhaust.

19. The system of claim 17, wherein at least some vents are configured to include force air cooling provisions.

20. The system of claim 1, wherein the antenna arrangement further comprises a radio in electrical communication with the radiating elements.

21. The system of claim 20, wherein the antenna arrangement is configured to transceive radiofrequency signals in two polarization states.

22. The system of claim 21, wherein a single conductive radiating element of the one or more radiating elements provides the two polarization states and the antenna arrangement includes two ports and two transceivers to provide signals with two different polarization states.

23. The system of claim 1, wherein the antenna arrangement has a substantially flat surface registered with the region of the window where the coating was removed.

24. The system of claim 1, wherein the removing is configured for facilitating reception of a cellular signal by defining the shape, size, and/or location of the region.

25. A method of transceiving radio frequency (RF) signals, the method comprising:

(a) disposing a window in a building, the window having a first surface facing an interior of the building; and (b) attaching an antenna arrangement to a building structure adjacent the first surface, wherein the antenna arrangement comprises one or more radiating elements configured to transceive the RF signals through the window; wherein:

the window includes a coating disposed on the first surface and/or on another surface parallel to the first surface, the coating (i) being an electrochromic device, (ii) having a low emissivity, and/or being antireflective;

the coating excludes a region proximate to the radiating elements; and the region is formed by removing material from a portion of the coating, the material removed including transparent metal oxides and/or a conductive polymer or gel.

26. The method of claim 25, wherein the coating excludes a region proximate to the radiating elements.

27. The method of claim 25, wherein the antenna is configured to provide cellular coverage outside and inside the building.

* * * * *